US011022290B2

(12) United States Patent
Chen

(10) Patent No.: US 11,022,290 B2
(45) Date of Patent: Jun. 1, 2021

(54) LED SECURITY LIGHT WITH SURROUNDING LAMP SHADE

(71) Applicant: Vaxcel International Co., Ltd., Carol Stream, IL (US)

(72) Inventor: Chia-Teh Chen, Taipei (TW)

(73) Assignee: VAXCEL INTERNATIONAL CO., LTD., Carol Stream, IL (US)

( * ) Notice: Subject to any disclaimer, the term of this patent is extended or adjusted under 35 U.S.C. 154(b) by 16 days.

(21) Appl. No.: 16/265,170

(22) Filed: Feb. 1, 2019

(65) Prior Publication Data

US 2020/0248898 A1 Aug. 6, 2020

(51) Int. Cl.

| F21V 23/04 | (2006.01) |
| F21V 1/00 | (2006.01) |
| F21V 5/04 | (2006.01) |
| F21S 8/04 | (2006.01) |
| H05B 45/20 | (2020.01) |
| H05B 47/11 | (2020.01) |
| H05B 47/19 | (2020.01) |
| H05B 47/105 | (2020.01) |
| F21Y 113/13 | (2016.01) |
| F21Y 115/10 | (2016.01) |

(52) U.S. Cl.
CPC ............ *F21V 23/0471* (2013.01); *F21S 8/04* (2013.01); *F21V 1/00* (2013.01); *F21V 5/04* (2013.01); *F21V 23/0435* (2013.01); *F21V 23/0464* (2013.01); *F21V 23/0478* (2013.01); *H05B 45/20* (2020.01); *H05B 47/105* (2020.01); *H05B 47/11* (2020.01); *H05B 47/19* (2020.01); *F21Y 2113/13* (2016.08); *F21Y 2115/10* (2016.08)

(58) Field of Classification Search
CPC ............ F21Y 2105/18; F21V 23/0464; F21V 23/0471; F21V 23/0478
See application file for complete search history.

(56) References Cited

U.S. PATENT DOCUMENTS

| 7,109,880 | B2 | 9/2006 | Sibalich et al. |
| 7,397,386 | B2 | 7/2008 | Sibalich et al. |
| 8,049,639 | B2 | 11/2011 | Sibalich et al. |
| 8,066,392 | B2 | 11/2011 | Wang |
| 8,866,392 | B2 | 10/2014 | Chen |
| 8,947,000 | B2 | 2/2015 | Chen |
| 9,345,112 | B2 | 5/2016 | Chen |
| 9,826,590 | B2 | 11/2017 | Chen |
| 10,154,564 | B2 | 12/2018 | Chen |
| 2019/0249849 | A1* | 8/2019 | Rodriguez ............ F21V 23/009 |

* cited by examiner

*Primary Examiner* — Sean P Gramling
(74) *Attorney, Agent, or Firm* — Li & Cai Intellectual Property (USA) Office

(57) ABSTRACT

An LED security light includes a base plate, a surrounding lamp shade, an LED illuminator, and a detector assembly. The surrounding lamp shade is fixed on the base plate. The LED illuminator includes a plurality of light emitting diodes, and is fully covered by the surrounding lamp shade. The detector assembly includes at least one lens and a detection circuit, disposed in the center of the base plate of the LED security light. The detector assembly is installed in an accommodating space formed between a cover plate and the base plate of the LED security light. The cover plate is recessed and mounted on an inner border of the surrounding lamp shade such that the cover plate can be illuminated by an edge light emitted from the LED illuminator. The lens is disposed to protrude outwardly through a circular opening of the cover plate.

39 Claims, 18 Drawing Sheets

LED SECURITY LIGHT WITH SURROUNDING LAMP SHADE

BACKGROUND OF THE INVENTION

1. Field of the Invention

The present disclosure is related to LED lighting fixture. In particular, the present disclosure relates to an LED security light featured with a surrounding lamp shade encompassing a detector/controller assembly.

2. Description of Related Art

U.S. Pat. No. 8,049,639 discloses a ceiling mount light with a 360-degree range viewing field to focus infrared energy into a motion sensor. The related art is configured with a lamp shade assembly having an opening (hollow recess) formed through the lamp shade and a motion detector assembly comprising a lens, a motion sensor and a light sensor. The motion detector assembly is installed inside the lamp shade assembly with the lens being disposed so as to protrude outwardly through the opening of the lamp shade assembly. A light source is disposed behind the motion detector assembly inside the lamp shade assembly.

With such configuration, the related art is subject to at least three constraints. The first constraint is that the ceiling mount light is bulky in order to accommodate the motion sensor, the incandescent light source and other accessories in the lamp shade assembly, which limits a design flexibility to be stylish. The second constraint is that such configuration is bound to have a dark shadow around the center of the lamp shade assembly since the illumination generated by the incandescent light source is partially blocked by the motion detector assembly. Since a detection capacity is determined by the dimension and curvature of the lens of the motion detector assembly, the larger the required detection range is, the bigger the lens needs to be, so that a larger area of black shadow is consequently produced. The black shadow proportionally damages the aesthetic view of the ceiling mount light. The third constraint is that the installation of a heat radiant incandescent bulb inside the enclosed lamp shade assembly makes the structure of the ceiling mount light more complicated in order to manage an excessive temperature caused by a heat buildup from the heat radiant incandescent bulbs. The heat buildup often causes instability or malfunction of the motion sensor, and therefore an extra cost for additional heat shielding and dissipating tasks is required in order to ensure a normal performance of the motion sensor.

SUMMARY OF THE INVENTION

One of the objectives of the present disclosure is to provide an LED ceiling mount light with a surrounding lamp shade designed with a compact and much thinner housing of the surrounding lamp shade to feature a more stylish look with a low heat generating and energy-saving light source.

Another of the objectives of the present disclosure is to provide an LED ceiling mount light with a surrounding lamp shade, which creates an accommodating space in the center of the LED ceiling mount light for installing the detector assembly, such that a detector assembly can be moved out from the surrounding lamp shade to eliminate the black shadow.

In order to achieve the above objectives, according to one exemplary embodiment of the present disclosure, an LED security light with a surrounding lamp shade is provided and includes a base plate, a surrounding lamp shade, an LED illuminator, and a detector assembly. The surrounding lamp shade is made of an optically transmissive material, and fixed on the base plate so as to define a housing space therebetween. The LED illuminator includes a circuit board shaped which is doughnut-shaped or ring-shaped, and a plurality of light emitting diodes mounted on the circuit board. The LED illuminator is fully covered by the surrounding lamp shade, and the surrounding lamp shade is further fastened to the base plate. The detector assembly includes at least one lens and a detection circuit, disposed in the center of the base plate of the LED security light and encompassed by the LED illuminator. The detector assembly is installed in an accommodating space formed between a cover plate and the base plate of the LED security light. The cover plate is recessed and mounted on an inner border of the surrounding lamp shade such that the cover plate can be illuminated by an edge light emitted from the LED illuminator, wherein the cover plate may be configured with an openwork or punched out motif; wherein a first lens is disposed to protrude outwardly through a circular opening of the cover plate. The LED illuminator is responsive at a first signal from the detector assembly to switch on the LED security light.

Thus, the present disclosure has advantages as follows. Compared with the U.S. Pat. No. 8,049,639, the present disclosure can provide a technology to design the LED ceiling mount light with a 360-degree motion sensor with a much thinner housing of lamp shade to feature a more stylish look since LEDs do not need much housing space to perform illumination. The present disclosure provides the surrounding lamp shade to replace a bowl-shaped or globe shaped lamp shade assembly commonly used in building the conventional LED ceiling mount light such that the detector assembly can be moved out from the lamp shade assembly to eliminate the constraints imposed on the related art. The present disclosure further includes a prospective design of creating an accommodating space in the center of the LED ceiling mount light for moving in the detector assembly.

For a further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

Figure 1:
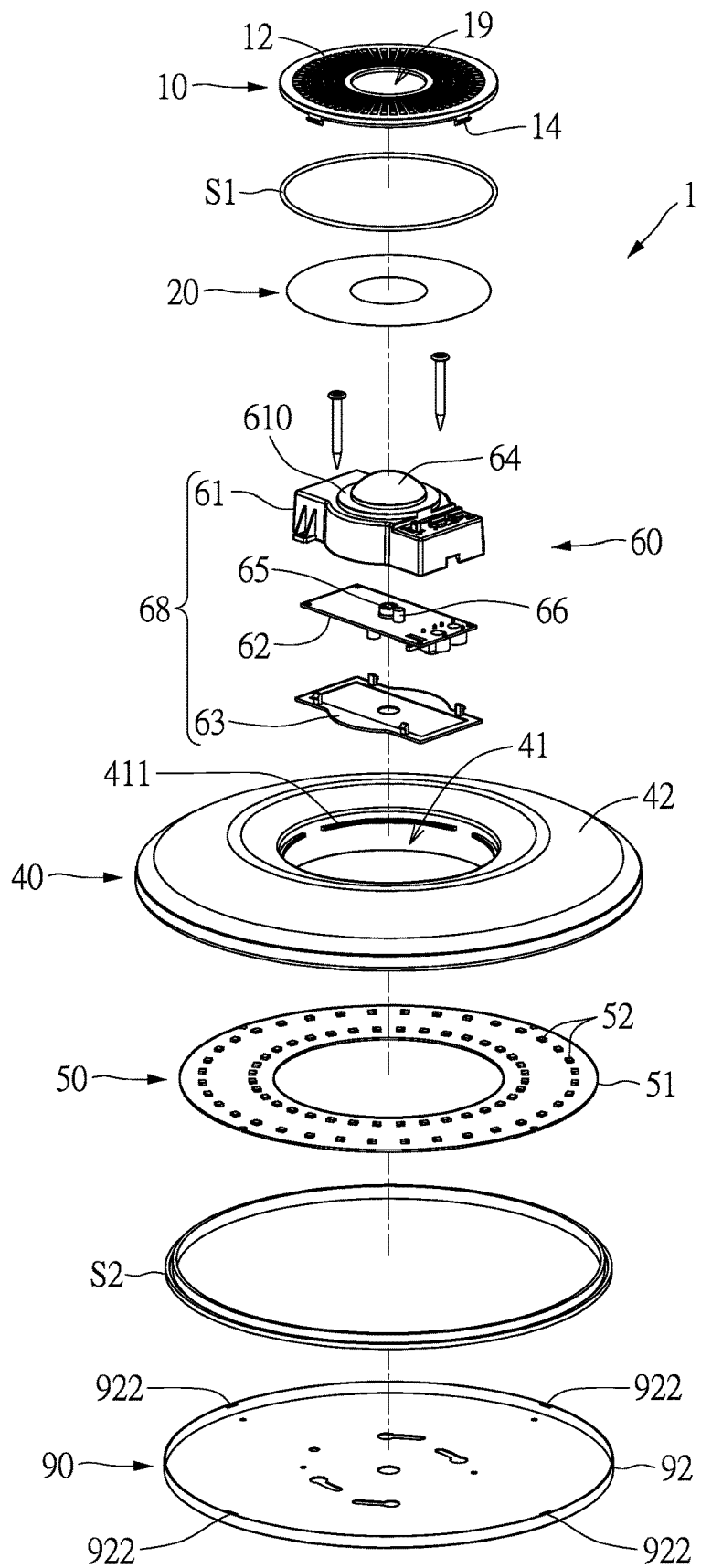
FIG. 1 is an exploded view of an LED security light of a first embodiment of the present disclosure.

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Reference is made to FIG. 1 to FIG. 4, which schematically illustrate exploded views, an assembled view, and a cross-sectional view of an LED security light with a 360-degree motion sensing capacity in accordance with a first embodiment of the present disclosure. The present disclosure provides an LED ceiling mount light, which could be used as an LED lighting fixture, or an LED security light 1 in particular. The LED security light 1 includes a surrounding lamp shade 40, an LED illuminator 50, a detector assembly 60, a base plate 90 for mounting the LED illuminator 50 and the detector assembly 60. The surrounding lamp shade 40 is integrated with the LED illuminator 50 as a surrounding LED illuminator assembly.

Figure 2:
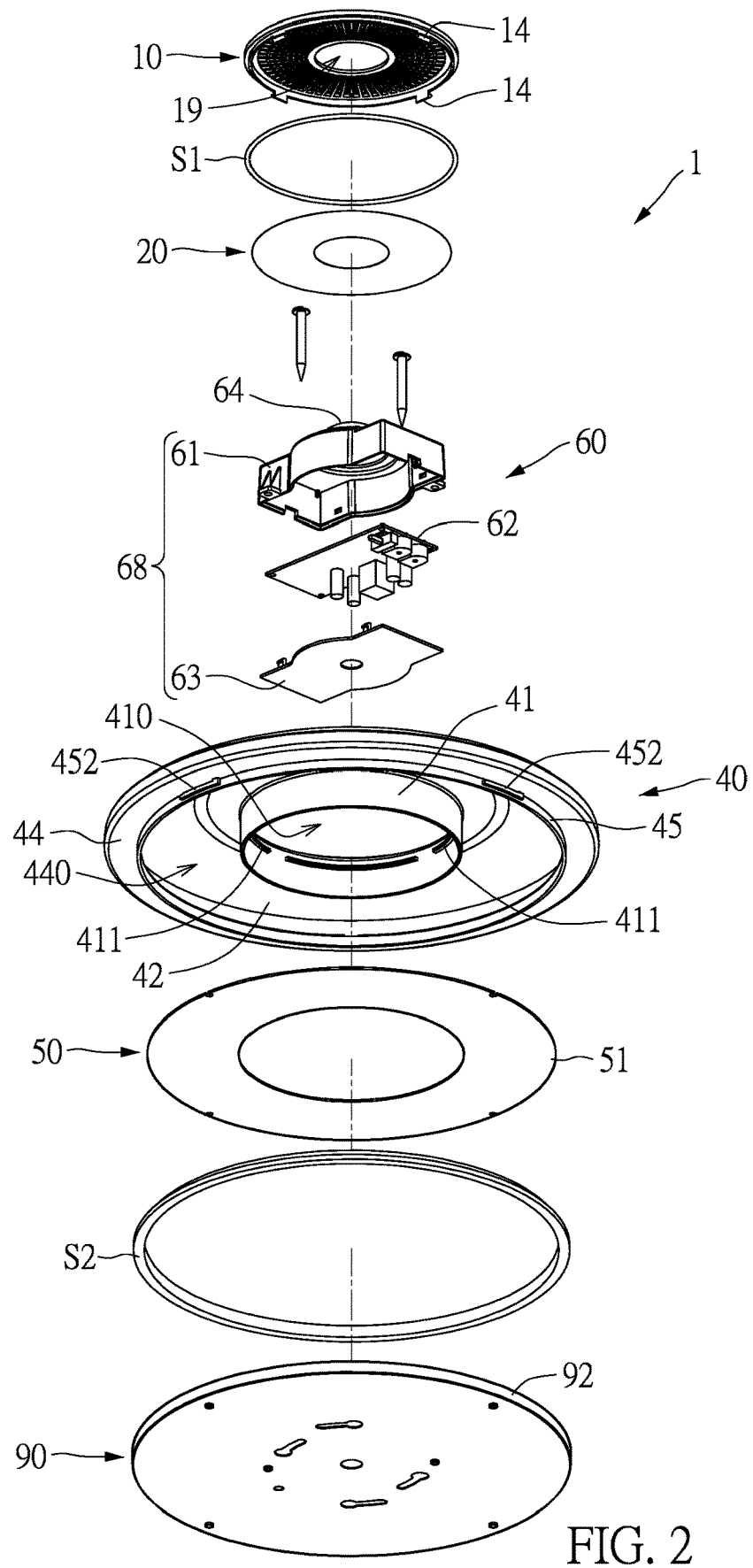
FIG. 2 is another exploded view of the LED security light of the first embodiment of the present disclosure.
Figure 3:
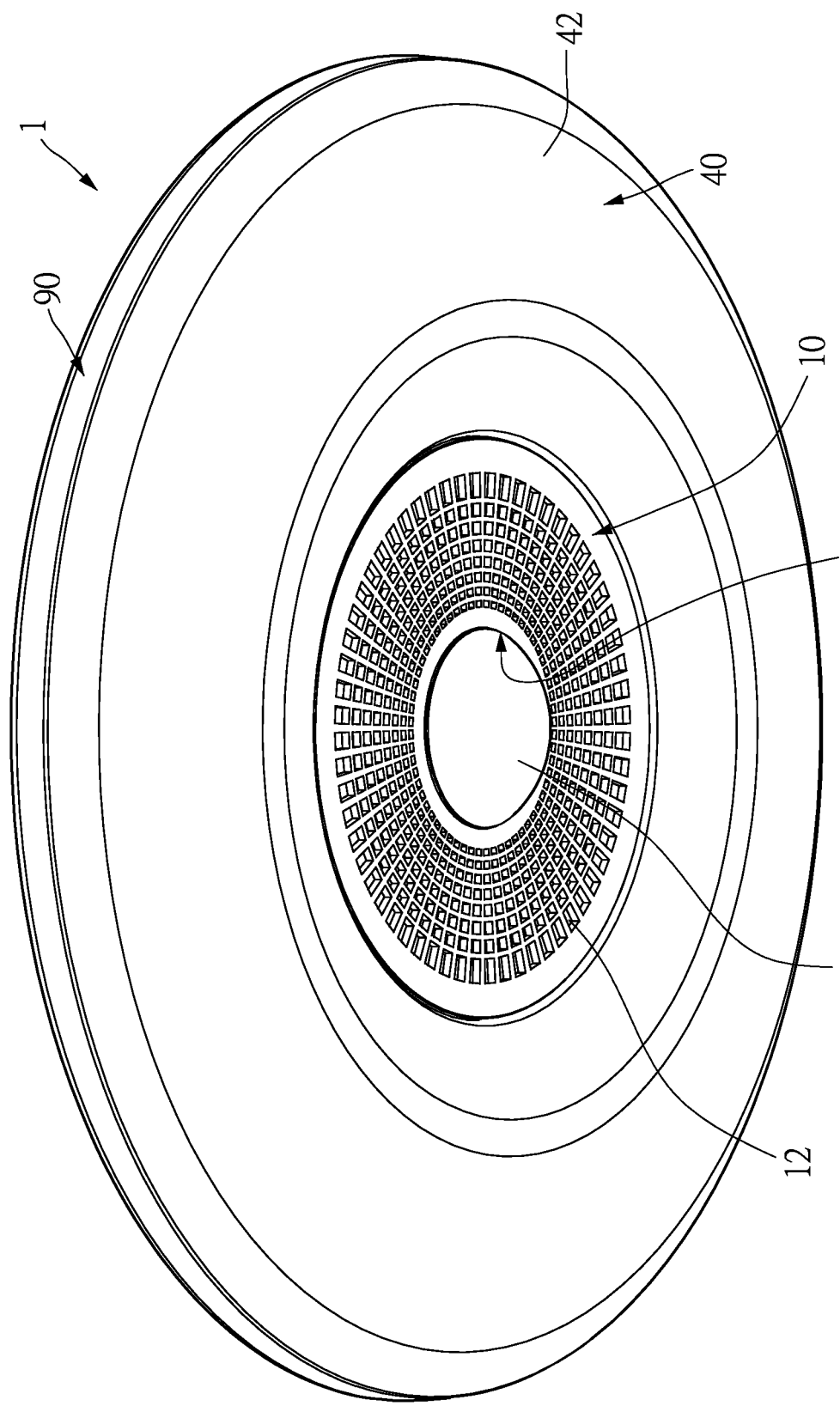
FIG. 3 is an assembly view of the LED security light of the first embodiment of the present disclosure.

The surrounding lamp shade 40 may be made of glass or other transparent or translucent materials known in the art such as acrylic plastic or polycarbonate plastic which can transmit and diffuse light. The surrounding lamp shade 40 is removably mounted on the base plate 90, by using such as regular nuts, regular screws or other decorative fastening elements. As shown in FIG. 2, the surrounding lamp shade 40 in this embodiment is ring-shaped or doughnut-shaped, but it is not limited thereto. The surrounding lamp shade 40 includes a cylindrical inner shell 41, a light-pervious shell 42 and a bottom wall 44. The cylindrical inner shell 41 connects to an inner edge of the light-pervious shell 42 and defines a center opening 410 with a central receiving space. The light-pervious shell 42 in this embodiment is ring-shaped, and defines a housing space 440 surrounding the central receiving space. The LED illuminator 50 is received in the housing space 440 of the light-pervious shell 42 of the surrounding lamp shade 40. The bottom wall 44 connects to an outer bottom edge of the light-pervious shell 42.

The LED illuminator 50 includes a circuit board 51 which is doughnut-shaped or ring-shaped, and a plurality of light emitting diodes 52 mounted on the circuit board 51. The detector assembly 60 includes at least one lens 64, a motion detector 65, a light sensor 66 and a printed circuit board 62 jointly disposed in a sensor housing 68 formed by a top cover 61 and a bottom cover 63. The motion detector 65, the light sensor 66 and the printed circuit board 62 are configured to a detection circuit. The top cover 61 has a lens opening 610 formed at the center thereof and allows the lens 64 to protrude outwardly of the sensor housing 68 for detecting a motion intrusion. The bottom cover 63 of the sensor housing 68 is mounted on the base plate 90. The lens 64 preferably is a spherical lens or a dome-shaped lens, and is mounted downwardly at the center of a ceiling pan (the base plate 90) facing the ground to perform the 360-degree motion detection. The lens 64 could be used for a passive infrared (PIR) sensor, and collects infrared rays from the motion intrusion and converges the infrared rays to a focal point where the motion detector 65 is located on the printed circuit board 62 for detecting a motion signal to turn on the LED ceiling mount light 1. Since the surrounding lamp shade 40 is configured with a thin housing, a detection angle of the lens 64 surrounded by the surrounding lamp shade 40 with a gap is not blocked. When a motion signal is detected by the motion sensor 65, the motion sensor 65 outputs a third signal to the control circuit to manage the LED illuminator to emit a second level light for a predetermined time duration before resuming performing the first level light. A light intensity of the second level light is higher than a light intensity of the first level light.

Figure 4:
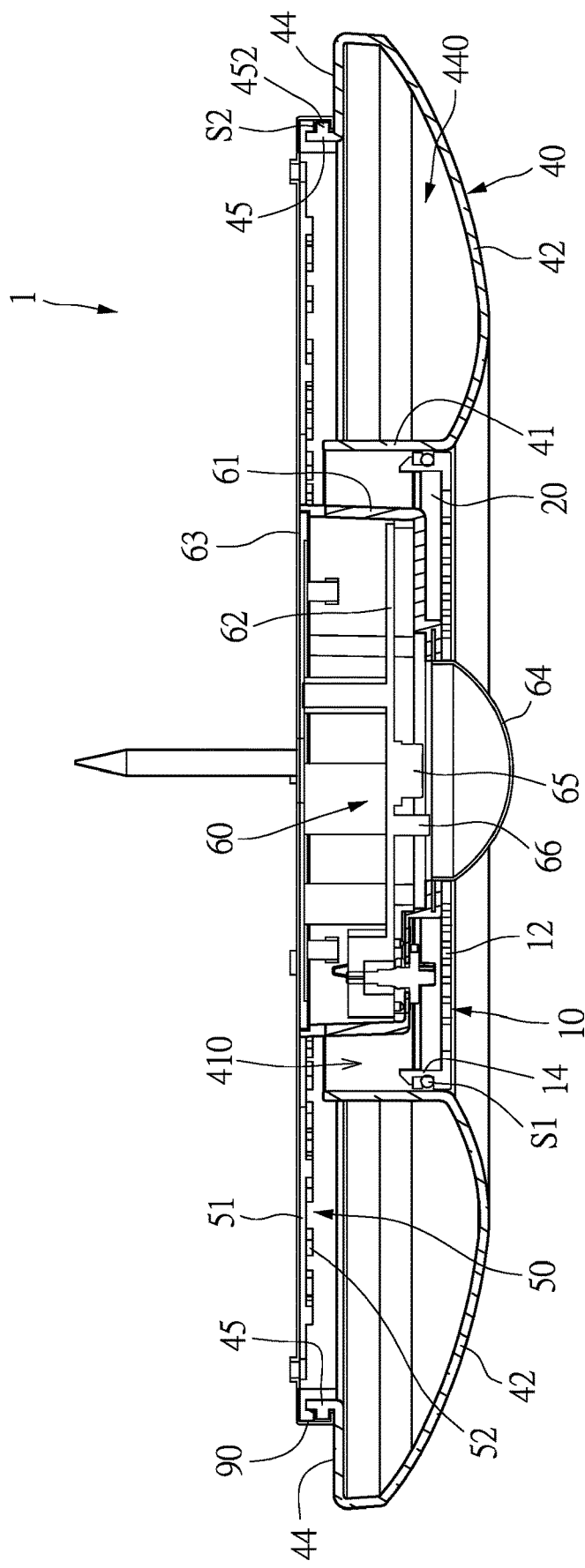
FIG. 4 is a cross-sectional view of the LED security light of the first embodiment of the present disclosure.

Reference is made to FIG. 2 and FIG. 4. A cover plate 10 can be designed to attach to the top cover 61. The cover plate 10 is doughnut-shaped matching the shape of the center opening 410 of the surrounding lamp shade 40. In this embodiment, the cover plate 10 is formed with a plurality of light-pervious holes 12. The cover plate 10 can be configured with an openwork or punched out motif to create an aesthetic design. The cover plate 10 is fixed to a lower edge of the cylindrical inner shell 41 of the surrounding lamp shade 40. A first waterproofing ring S1 can be disposed between the cover plate 10 and the surrounding lamp shade 40. The cover plate 10 has a plurality of hooking tabs 14 protruded from an outer edge thereof. The cylindrical inner shell 41 has a plurality of wedged ribs 411 formed on an inner surface thereof. The hooking tabs 14 are hooked to the wedged ribs 411 correspondingly. A circular opening 19 is formed at the center of the cover plate 10 and is coincided with the lens opening 610 of the top cover 61. As shown in FIG. 4, the circular opening 19 of the cover plate 10 allows the lens 64 of the detector module 60 to outwardly protrude from both the top cover 61 and the cover plate 10 to collect infrared ray signal. The cover plate 10 assembled with the detector assembly 60 is also encompassed by the surrounding lamp shade 40 and can be illuminated by the edge light of the doughnut-shaped LED illuminator assembly to provide visual aesthetics when the light is turned on.

A light diffuser sheet 20 can attach an inner side of the cover plate 10, and has a shape corresponding to that of the light-pervious holes 12.

The height of the sensor housing 68 of the detector assembly 60 is lower than the height of the surrounding lamp shade 40. The sensor housing 68 of the detector assembly 60 is fully received in the cylindrical inner shell 41 of the surrounding lamp shade 40, and arranged above the cover plate 10. Light from the LED illuminator 50 can be radiated through the light-pervious shell 42 of the surrounding lamp shade 40, and further passes the cylindrical inner shell 41 and then passes through the cover plate 10, so as to illuminate a central portion of the LED security light 1. Therefore, there is no dark shadow around the center of the surrounding lamp shade.

As shown in FIG. 2, in this embodiment, the surrounding lamp shade 40 has a cylindrical retaining wall 45 on a bottom side thereof facing the base plate 90. The cylindrical retaining wall 45 is extended from an inner edge of the bottom wall 44, and is formed with a plurality of hooks 452 on an outer surface thereof. The base plate 90 has a surrounding wall 92 protruding from a periphery edge thereof. The surrounding wall 92 has a plurality of wedged bumps 922 formed on an inner surface thereof corresponding to the hooks 452. By rotating the lamp shade 40 related to the base plate 90, the hooks 452 cooperate with the bumps 922, such that the lamp shade 40 can be fixed to the base plate 90 in a rotatable manner. A second waterproofing ring S2 can be disposed between the lamp shade 40 and the base plate 90.

The motion detector 65 is used to detect movement of heat generated from a living creature. The light sensor 66 is also positioned on the same printed circuit board 62 to disable the illumination during the day time. The light sensor 66 includes at least one photocell. When an ambient light detected by the light sensor 66 is lower than a first preset value, such as a dusk level, the light sensor outputs the first signal to a control circuit to manage the LED illuminator to emit a first level light. When the ambient light detected by the light sensor is higher than a second preset value, such as a dawn level, the light sensor outputs a second signal to the control circuit to switch off the LED illuminator. In addition, when a motion signal is detected by the motion sensor 65, the motion sensor 65 outputs a third signal to the control circuit to manage the LED illuminator to emit the first level light for a predetermined time duration before resuming a prior state. A few control switches (not shown in FIG. 1) may additionally be installed on the same printed circuit board 62 to adjust other operating parameters such as a timer for setting a light-on duration triggered by the motion sensor, or a sensitivity switch for setting a detection distance of the motion sensor, or a sensitivity switch for setting a dusk level and dawn level of the photo cell at which the light is turned on and turned off.

The base plate 90 is attached to a mounting bracket (not shown) which is used to mount the LED ceiling mount light 1 to an electrical junction box.

Compared with the prior art, the present disclosure has at least four advantages as follows. The first advantage is that the LED as a light source only consumes around 15% or less of electric power consumed by an incandescent bulb for the same lumens output. The second advantage is that the thin LED illuminator of light emitting diodes enables the design of lighting fixtures to become much more flexible and stylish without being constrained by the bulky structure of the incandescent bulb. Reference can be made to the compact and stylish look of FIG. 1 of the first embodiment of the present disclosure in comparison with the design of the prior art. The third advantage is that no heat would be built up in the housing space formed by the surrounding lamp shade 40. Although the LED also generates heat when the light is turned on, the heat level is substantially lower and is generated at the bottom of the LED cell, which is dissipated by the base plate 90 (a large piece of metallic pan). No heat is built up above the LED cell along the direction of light projection in the surrounding lamp shade 40, and the temperature is essentially equal to the room temperature. With such characteristics of the relationship between heat and illumination, the present disclosure does not require a complicated arrangement for heat shielding and for protecting the electronic performance from being affected by an excessive temperature, even when the detector module 60 is to be positioned in the lamp shade. The fourth advantage is that the surrounding construction of the surrounding lamp shade 40 enables the detector assembly 60 to be separated from the LED illuminator 50 and to be positioned at the center of the LED ceiling mount light 1 for performing the 360-degree motion detection without exposing to the generated heat. Therefore, the motion detector 65 can be adequately isolated from a heat generating source of the LED illuminator 50. The malfunction of the electronics of the motion detector 65 due to excessive temperature can be avoided according to the present disclosure. In the U.S. Pat. No. 8,049,639, the heat management is a big issue and one of the key technologies is isolating the motion sensor from the radiant heat generated by the incandescent bulb. The feature that the LED illuminator 50 in the present disclosure does not generate radiant heat substantially simplifies the engineering structure for configuring a motion sensor security light instead of innovating a surrounding construction. The surrounding construction of the surrounding lamp shade also enables a designer to realize any fine art without similar constraints set by the prior art.

Please refer to FIGS. 5A, 6A, 7A, and 8A which are bottom views of an LED security light of second, third and fourth embodiments of the present disclosure. These embodiments are variations of the first embodiment with different aesthetical designs of the surrounding lamp shade, the cover plate and the base plate. In terms of function, these embodiments are the same as the first embodiment characterized with the surrounding lamp shade covering the LED illuminator to form the compact LED illuminator assembly to encompass the detector assembly (e.g. the motion sensor) and the cover plate jointly mounted to a base plate to attach the ceiling space through the mounting bracket. With the above functional commonality, schematic drawings are sufficient to describe the aesthetic designs of these embodiments and there is no need to show the exploded view of each of the four embodiments. These four embodiments are only representative of some exemplary embodiments under the first embodiment of the present disclosure, and not presented to limit the scope of the present disclosure.

Second Embodiment

Figure 5A:
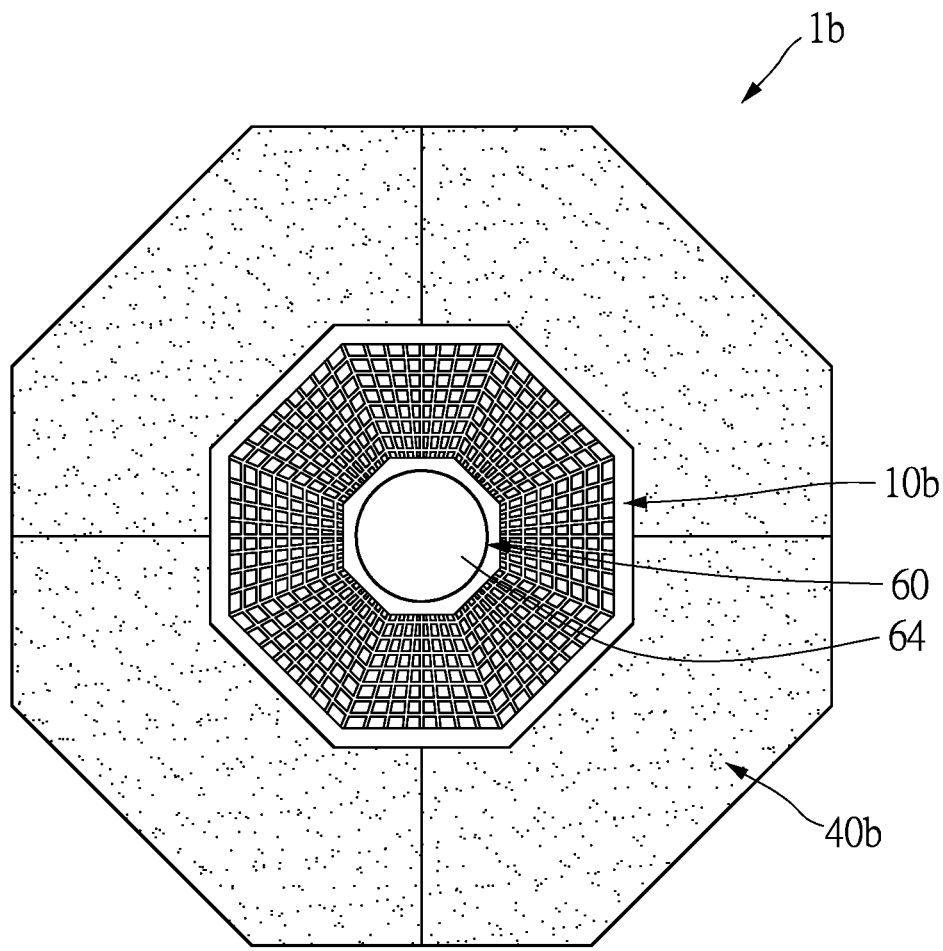
FIG. 5A is a bottom view of an LED security light according to a second embodiment of the present disclosure.
Figure 5B:
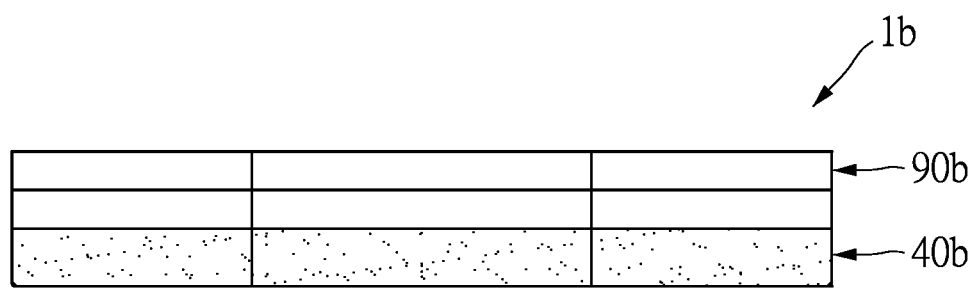
FIG. 5B is a side view of an LED security light according to the second embodiment of the present disclosure.

In the second embodiment as shown in FIG. 5A and FIG. 5B, the surrounding lamp shade 40b is designed with an octagonal shape removably mounted on the base plate through fastening elements to cover a surface-mounted LED illuminator to form a surrounding LED illuminator assembly (not shown). A cover plate 1b is designed as an octagonal-shaped doughnut with an openwork or a punched out motif to match the surrounding lamp shade 40b although the cover plate 1b can also be designed in a circular shape. The lens 64 of the detector assembly 60 remains spherical in shape to perform the 360-degree motion detection, and a base plate 90*b* is designed with an octagonal shape to match the shape of the surrounding lamp shade 40*b*.

Third Embodiment

Figure 6A:
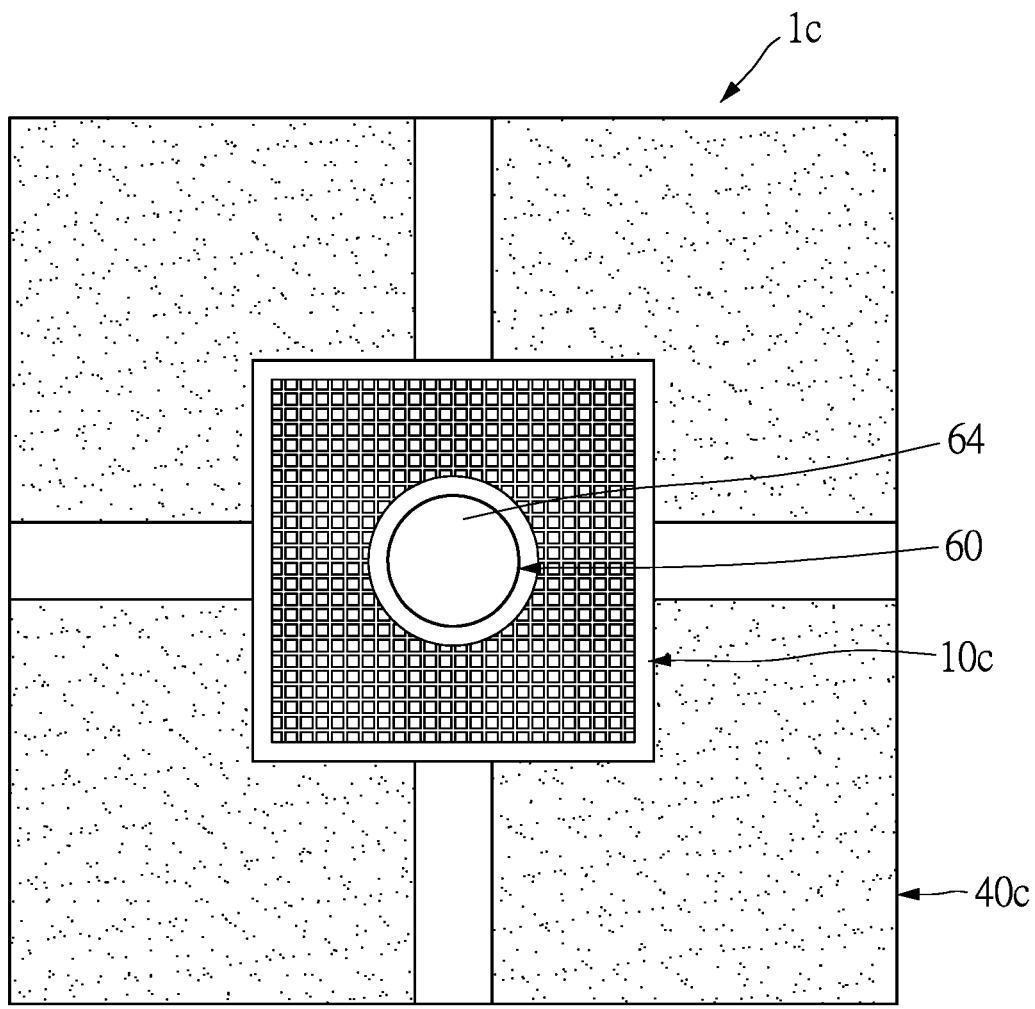
FIG. 6A is a bottom view of the LED security light of the third embodiment of the present disclosure.
Figure 6B:
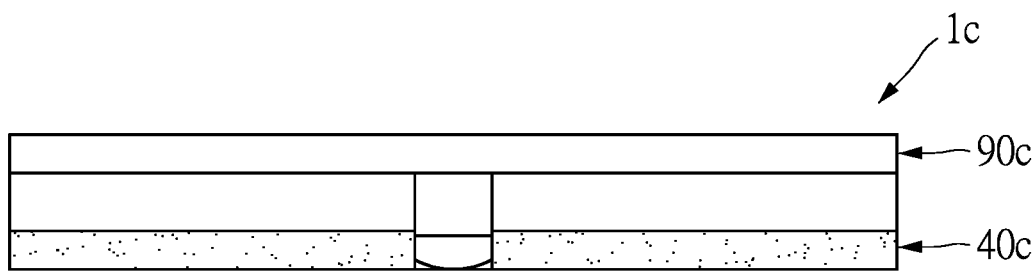
FIG. 6B is a side view of the LED security light according to the third embodiment of the present disclosure.

In the third embodiment as shown in FIG. 6A and FIG. 6B of the present disclosure, a surrounding lamp shade 40*c* is designed in a square shape removably mounted on a base plate 90*c* through the fastening elements to cover a surfaced mounted LED illuminator to form a surrounding LED illuminator assembly (not shown). A cover plate 10*c* is also designed with a square shape to match the square shape of the surrounding lamp shade 40*c*, the lens 64 of the detector assembly 60 remains spherical in shape to perform the 360-degree motion detection, and the base plate 90*c* is also in a square shape to match the surrounding lamp shade 40*c*.

Fourth Embodiment

Figure 7A:
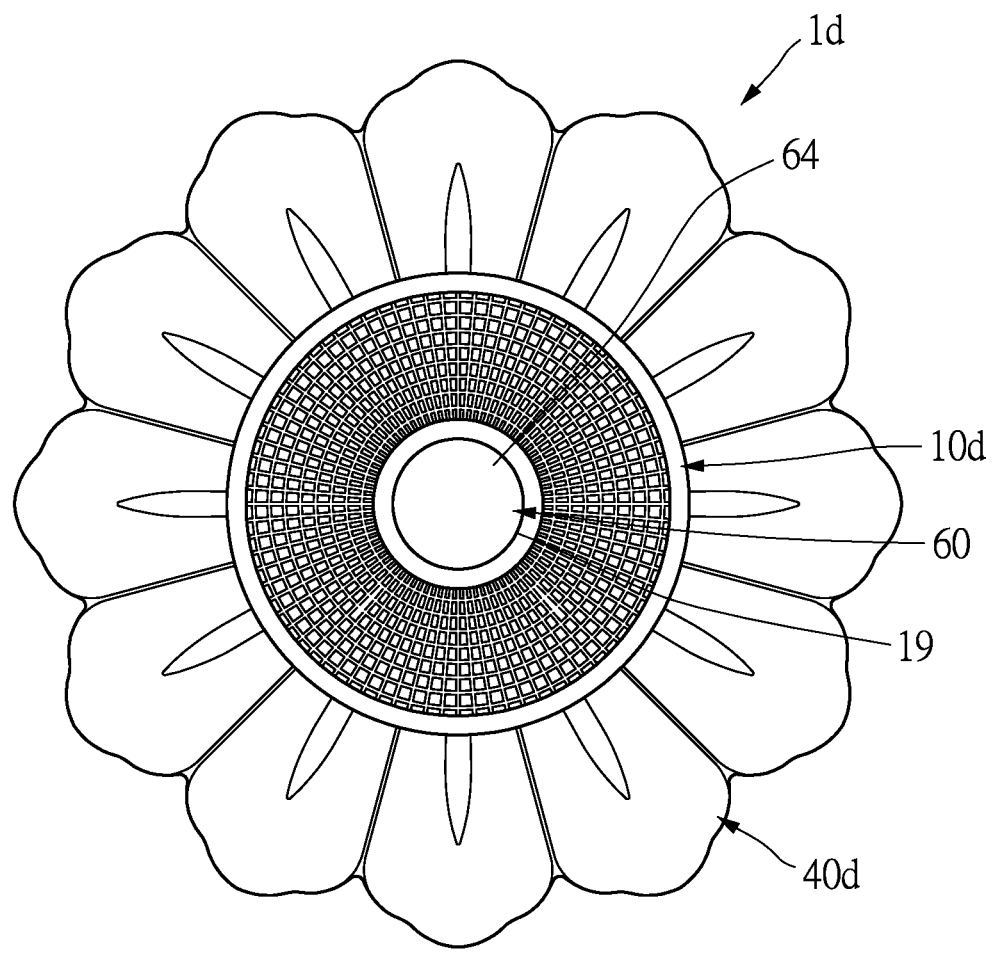
FIG. 7A is a bottom view of an LED security light of a fourth embodiment of the present disclosure.
Figure 7B:
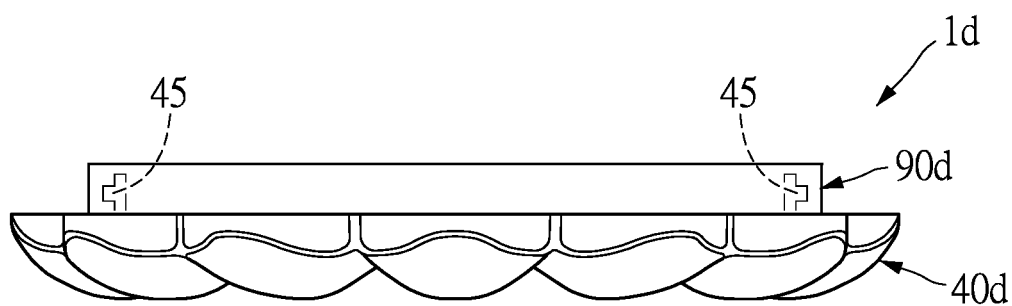
FIG. 7B is a side view of the LED security light of the fourth embodiment of the present disclosure.

In the fourth embodiment as shown in FIG. 7A and FIG. 7B of the present disclosure, a surrounding lamp shade 40*d* is designed with a more decorative doughnut skirted with a floral pattern on the outer boundary of the decorative doughnut. The surrounding lamp shade 40*d* is removably mounted on the base plate 90*d* through the fastening elements to cover the surfaced mounted LED illuminator to form the surrounding LED illuminator assembly. A cover plate 10*d* is designed in a circular shape to complement the floral design of the outer boundary of the surrounding lamp shade 40*d*. The lens 64 of the detector module 60 remains a spherical shape to perform the 360-degree motion detection. The base plate 90*d* can be designed with the same shape as that of the first embodiment, and the surrounding lamp shade 40*d* is designed to have cylindrical retaining wall 45 with the same shape as the first embodiment, so as to be fixed to the base plate 90*d*.

Fifth Embodiment

Figure 8A:
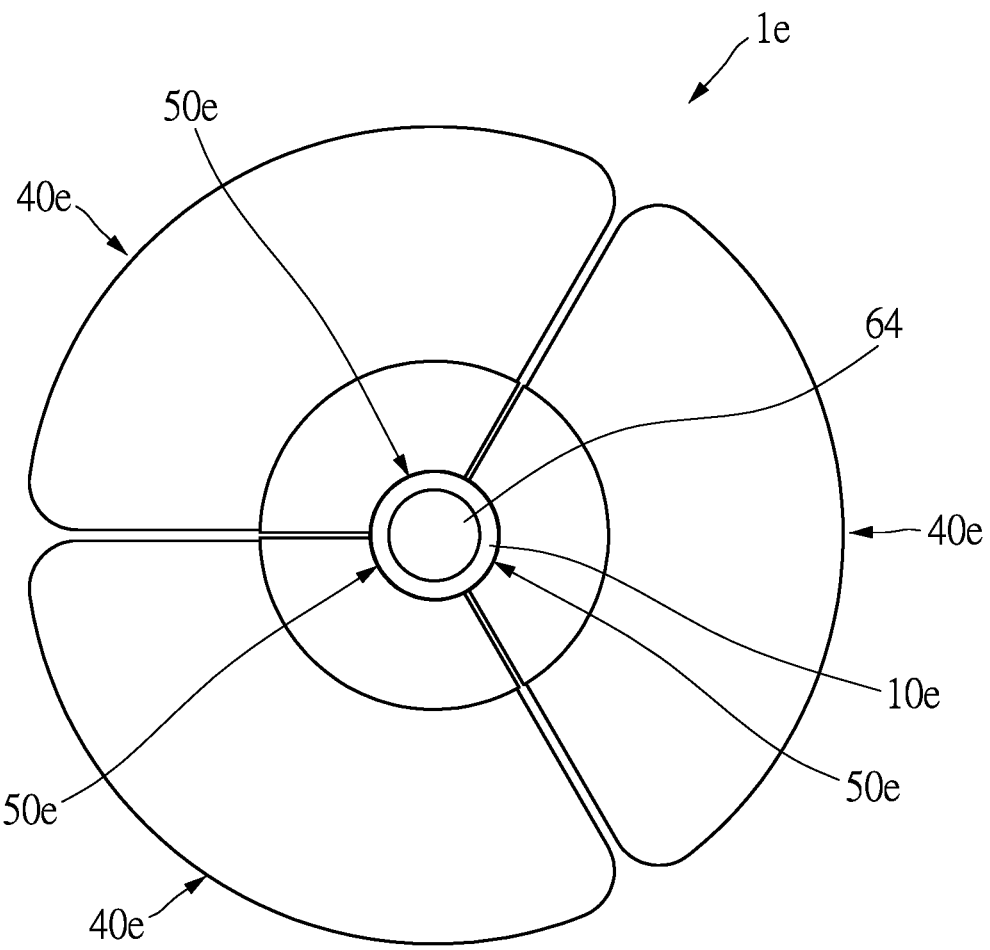
FIG. 8A is a bottom view of an LED security light of a fifth embodiment of the present disclosure.
Figure 8B:
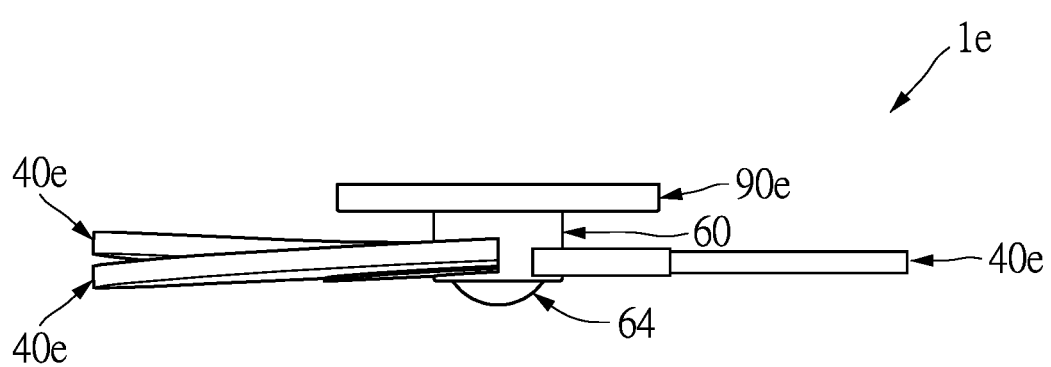
FIG. 8B is a side view of the LED security light of the fifth embodiment of the present disclosure.

In the fifth embodiment as shown in FIG. 8A and FIG. 8B of the present disclosure, a surrounding lamp shade 40*e* is designed with two layers of three-piece arcs removably mounted on the circular base plate 90*e* through the fastening elements to respectively cover each of LED illuminator to form a surrounding LED illuminator assembly to encompass the detector assembly 60. A cover plate 10*e* is designed in a circular shape to match the surrounding LED illuminator assembly. The lens 64 of the detector assembly 60 remains a spherical shape to perform the 360-degree motion detection. The base plate 90*e* is designed to receive the surrounding LED illuminator assembly.

The present disclosure provides a functional platform for designing a compact LED lamp characterized with a surrounding LED illuminator assembly to encompass a functional art, a decorative art or a combination of both a functional art and a decorative art.

Sixth Embodiment

Figure 9A:
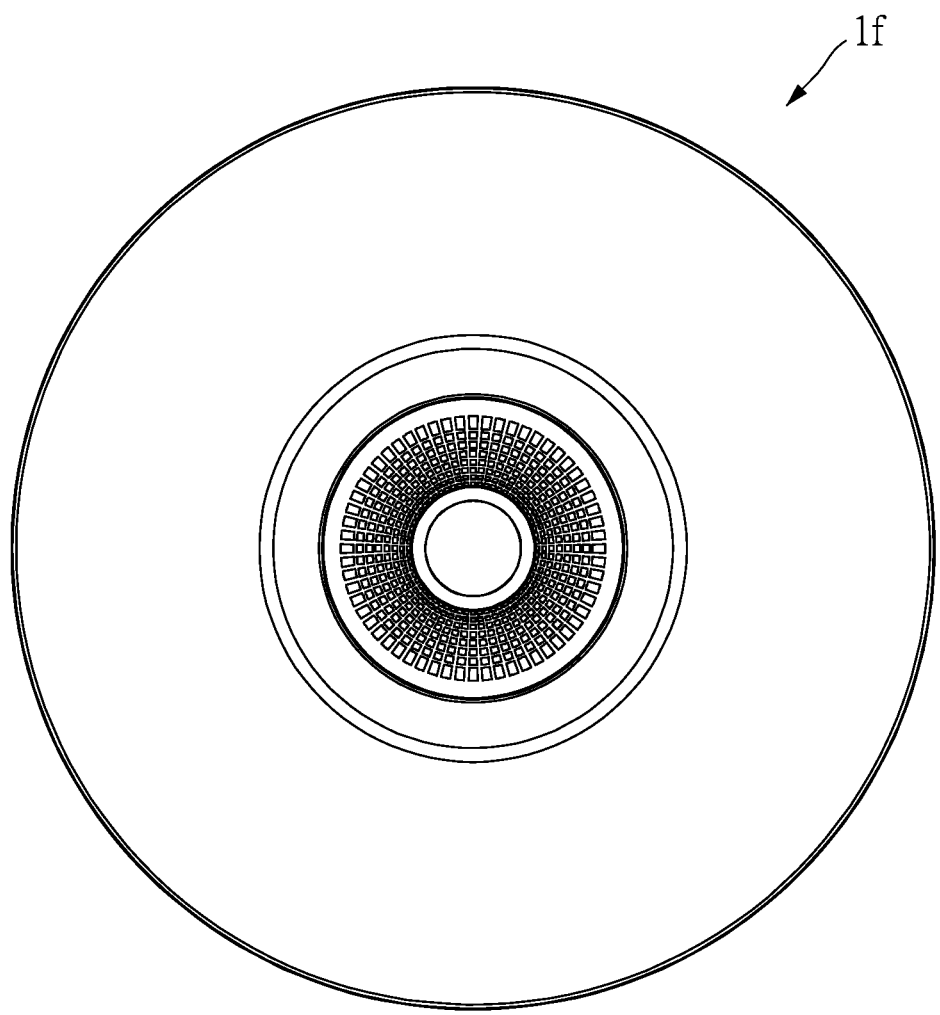
FIG. 9A is a bottom view of an LED security light of a sixth embodiment of the present disclosure.
Figure 9B:
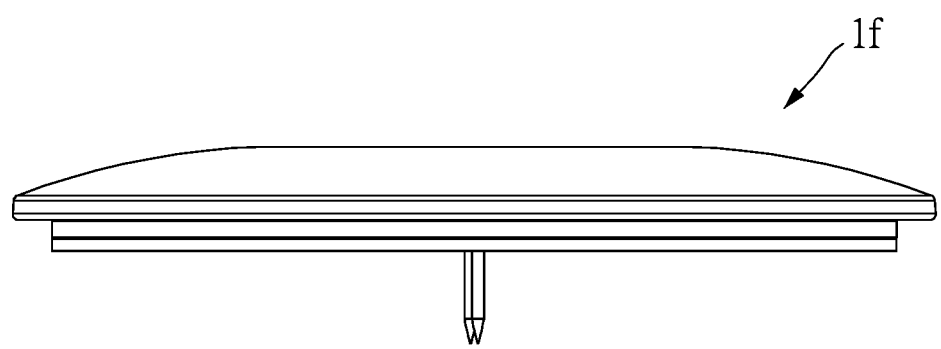
FIG. 9B is a side view of the LED security light of the sixth embodiment of the present disclosure.
Figure 9C:
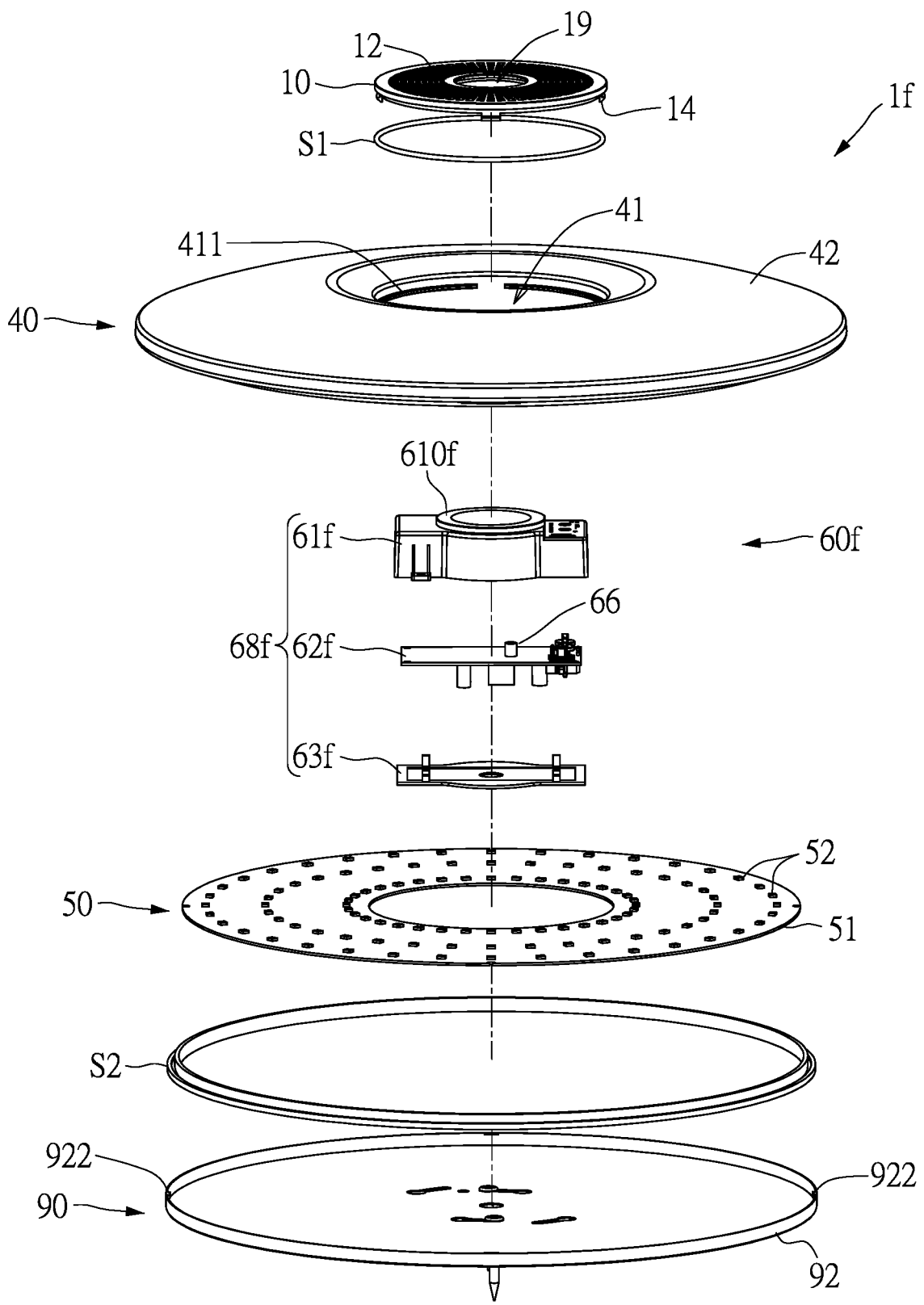
FIG. 9C is an exploded view of the LED security light of the sixth embodiment of the present disclosure.

Please refer to a sixth embodiment of the present disclosure as shown in FIG. 9A to FIG. 9C, which has an art design similar to FIG. 1 of the first embodiment except the detector assembly 60*f* now only includes a light sensor 66, such as a photocell, to perform a dusk to dawn illumination control.

Seventh Embodiment

Figure 10A:
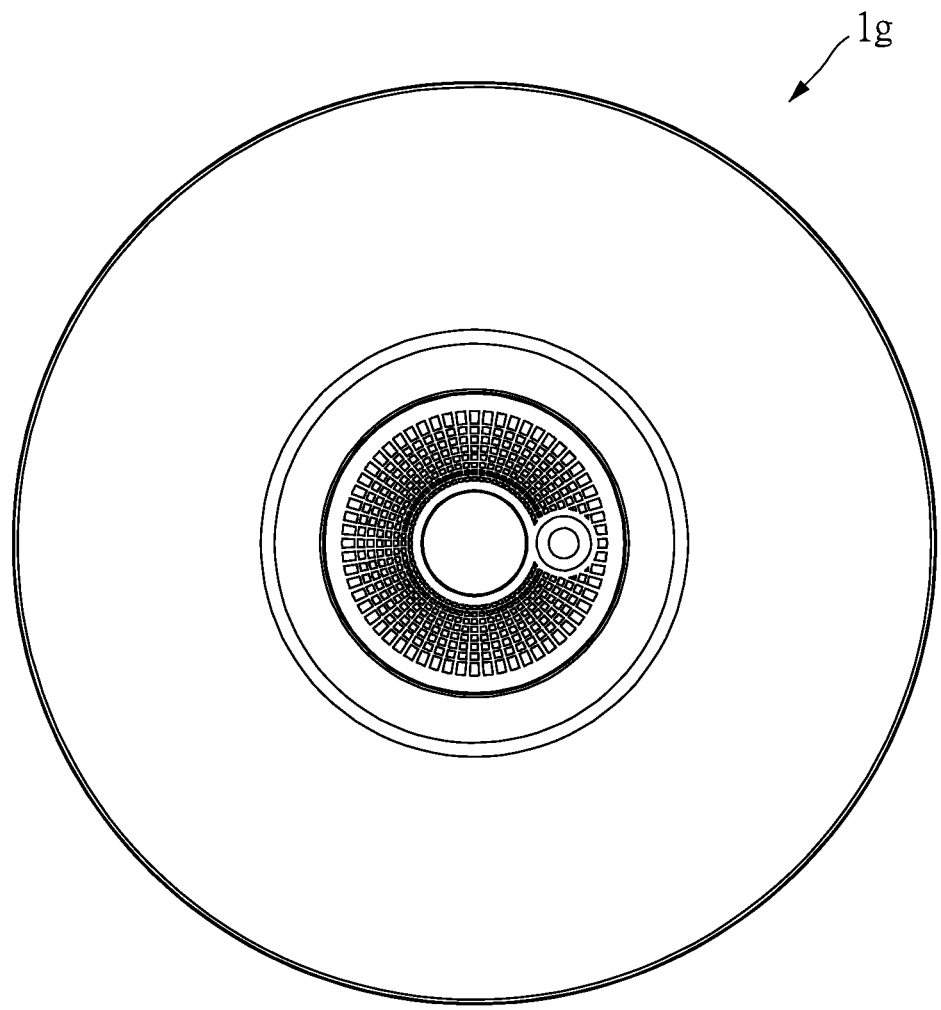
FIG. 10A is a bottom view of an LED security light of a seventh embodiment of the present disclosure.
Figure 10B:
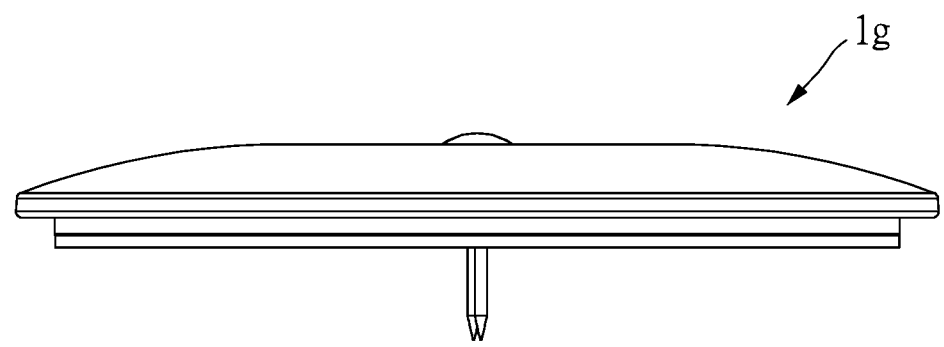
FIG. 10B is a side view of the LED security light of the seventh embodiment of the present disclosure.
Figure 10C:
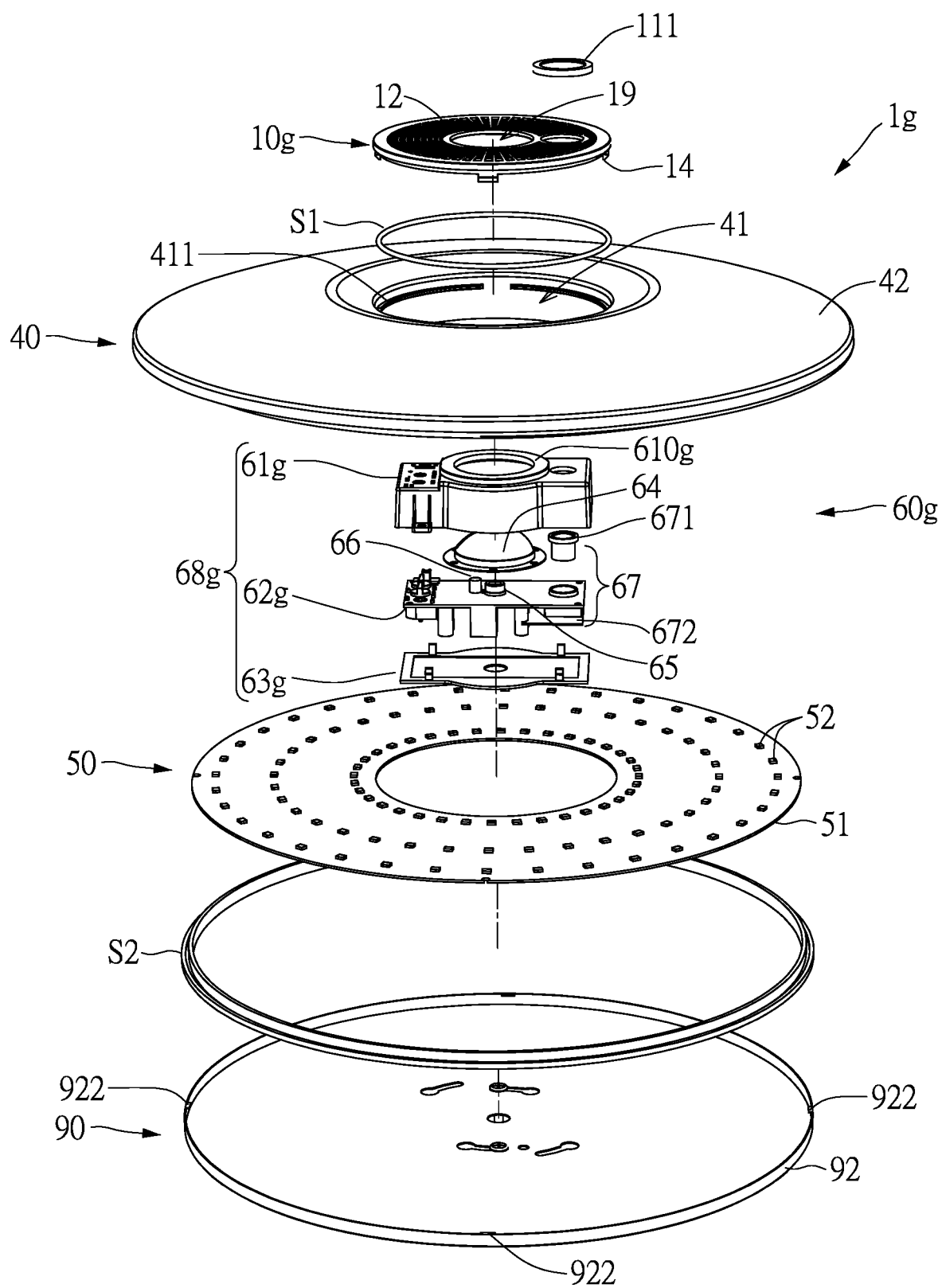
FIG. 10C is an exploded view of the LED security light of the seventh embodiment of the present disclosure.

Please refer to a seventh embodiment of the present disclosure as shown in FIG. 10A to FIG. 10C, which has an art design similar to FIG. 1 of the first embodiment except the detector assembly 60*g* now further includes a video detector 67 for photographing, recording, processing and transmitting scenes of motion intrusion activated by a motion sensor in a detection zone, the video detector 67 being composed of a camera lens 671 and a video circuit board 672 for photographing, recording, processing and transmitting a motion intrusion event, the video circuit board 672 being positioned behind a cover plate 10*g* and attached to a base plate 10*g*, and wherein the cover plate 10*g* has a second opening.

Figure 11A:
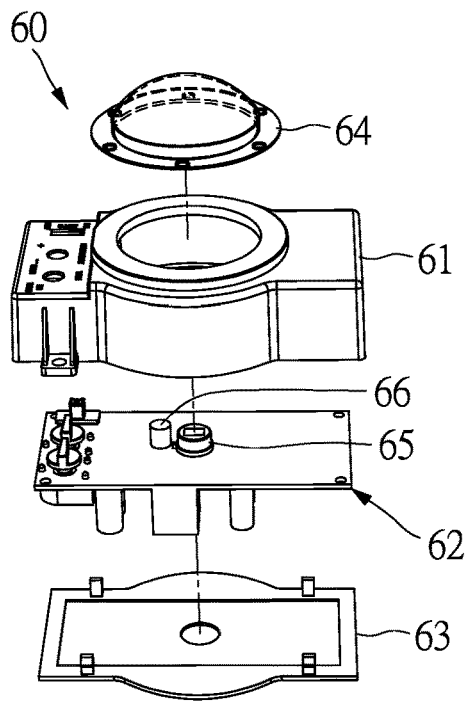
FIG. 11A-FIG. 11D are exploded views of various detector assemblies of the present disclosure.

Referring to FIG. 11A, a detector assembly 60 is illustrated in detail. A detector assembly 60 includes a light sensor 66, such as a photo cell, a motion detector 65, a housing and a printed circuit board integrated together to perform both mechanical connection and detection function. The photo cell is to assure a lighting fixture to be turned on when an ambient light is lower than a predetermined value. The motion sensor 65 is to assure the lighting fixture to be turned on when there is a motion intrusion is detected.

Figure 11B:
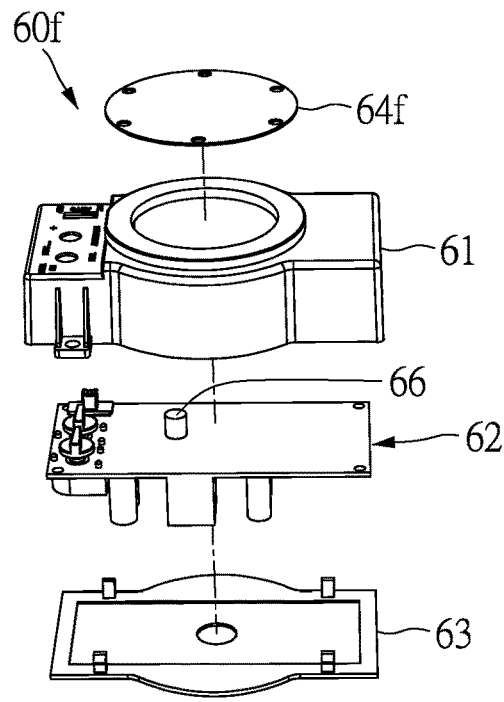
Figure 11C:
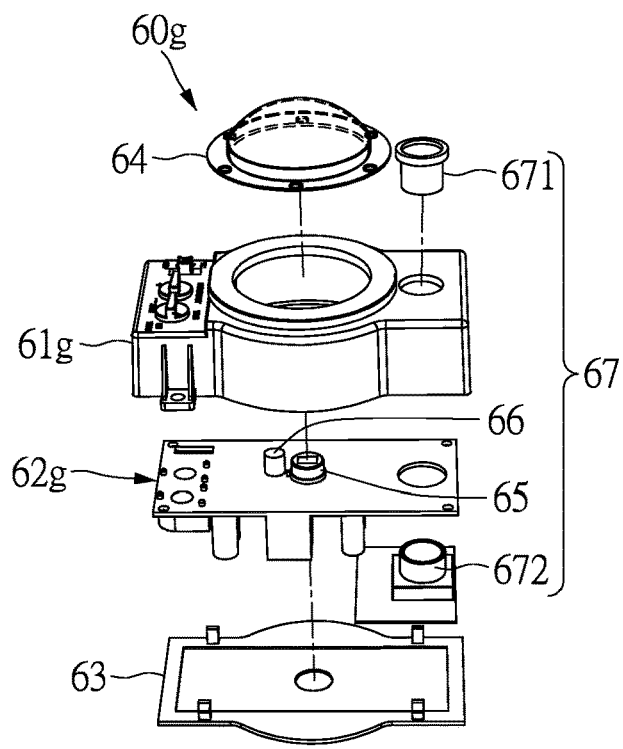

Referring to FIGS. 11B and 11C, detector assemblies 60*f* and 60*g* are similar to the detector assembly 60 in FIG. 11A except that the detector assembly 60*f* includes a photo cell 66 only and detector assembly 60*g* is composed with a video detector 67, a motion detector 65 and a light sensor 66, such as a photocell. The detector assemblies 60*f* and 60*g* perform similar functions as described in previous embodiments and are not redundantly repeated.

Figure 11D:
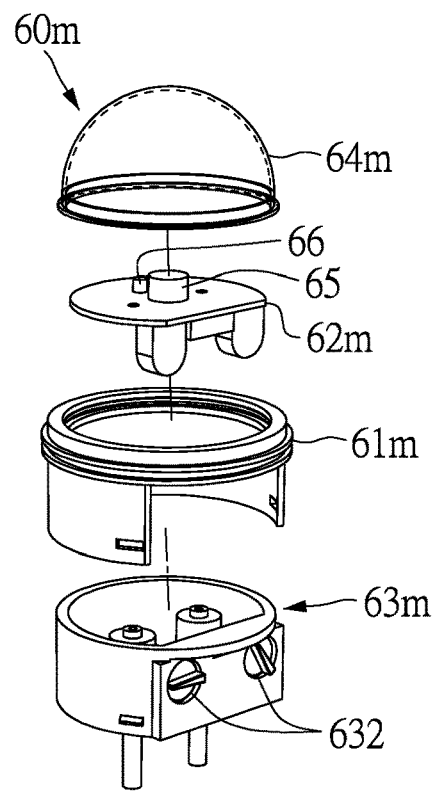

Referring to FIG. 11D, a detector assembly 60*m* is a portable detector assembly performs similar function as those of the detector assemblies 60, 60*f* and 60*g* except that the detector assembly 60*m* is designed to detachably insert or remove from an LED lighting fixture. The portable detector assembly 60*m* has advantages of easy adjustment, maintenance and choices of types of detection fits to the LED lighting fixture. The detector assembly 60*m* has a top cover 61*m*, a detection circuit 62*m*, a lower cover 63*m*, and a lens 64*m*. The detection circuit 62*m* has a photo cell 66, and a motion detector 65. The top cover 61*m* and the detection circuit 62*m* are rotatable relative to the lower cover 63*m*, so as to hide or expose the adjusting elements 632.

Eighth Embodiment

Figure 12:
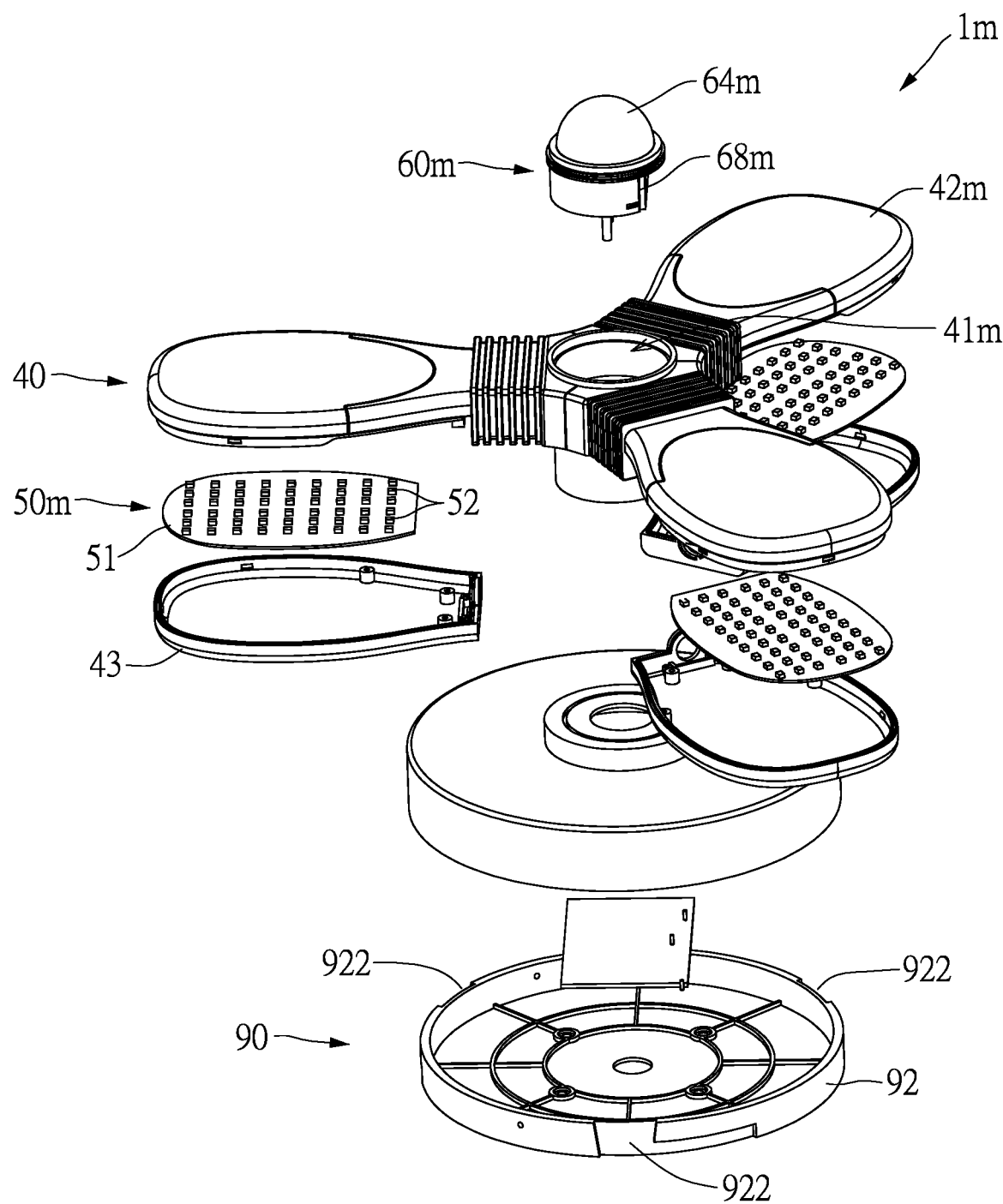
FIG. 12 is an exploded view of a LED security light of eighth embodiment of the present disclosure.

In the eighth embodiment 1*m* as shown in FIG. 12 of the present disclosure is an embodiment including multiple LED illuminators. The surrounding LED illuminator assembly includes a plurality of LED illuminators 50*m* configured to jointly encompass a detector assembly 60*m*, the light emitting diodes 52 of the LED illuminator 50*m* are evenly allocated to each LED illuminator 50*m*, each LED illuminator 50*m* also includes a lamp shade 42*m*, a bottom plate 43 and an arm structure 41*m* configured to mechanically connect to the bottom plate 43 and to electrically connect to a power source controlled by the detection circuit 62*m* (as shown in FIG. 11D), wherein the lamp shade 42*m* is fastened to the bottom plate 43 to create a housing space for accommodating and installing the allocated light emitting diodes 52 to form each LED illuminator 50.

Ninth Embodiment

Figure 13:
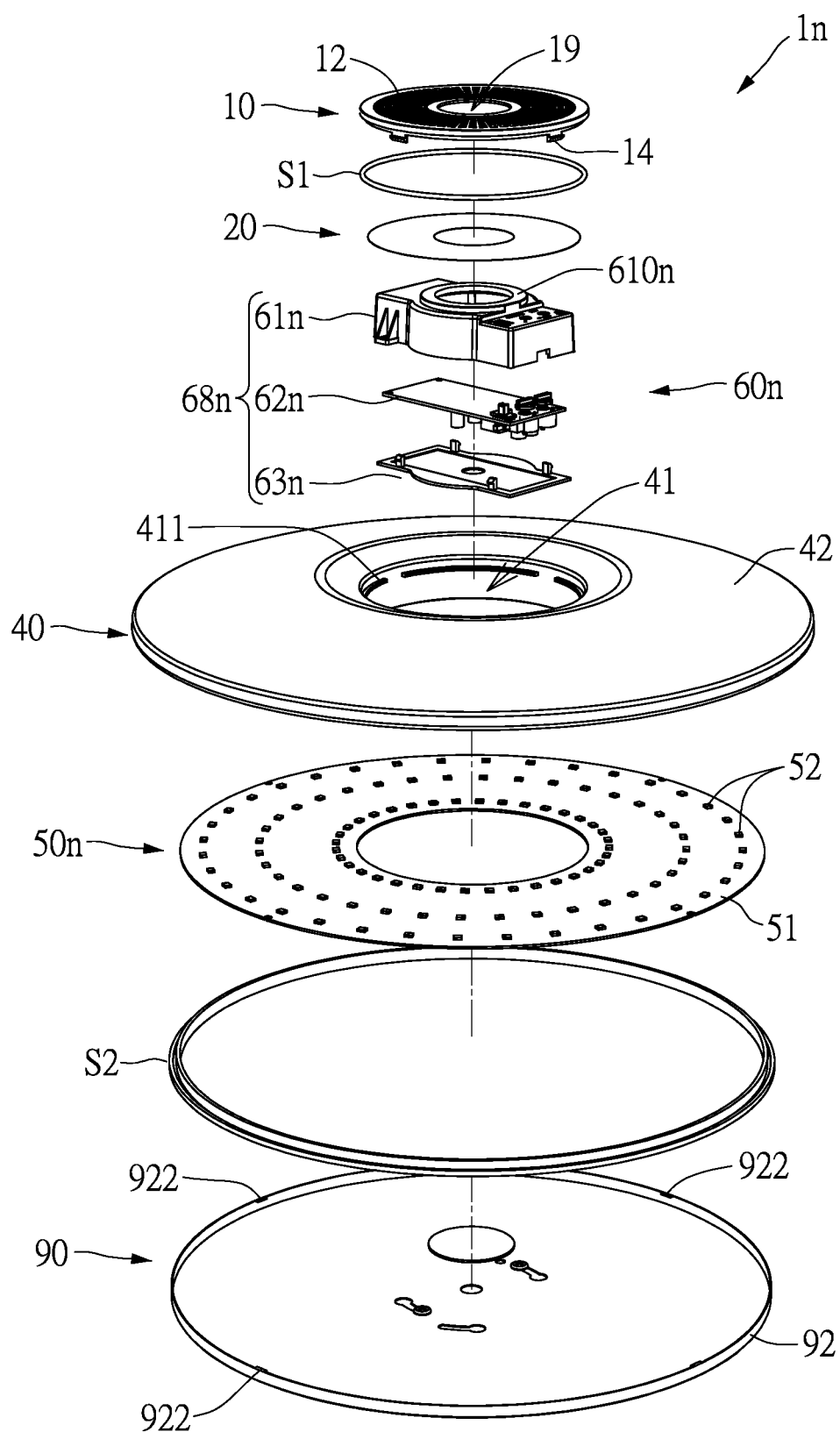
FIG. 13 is an exploded view of a LED security light of ninth embodiment of the present disclosure.

Reference is made to FIG. 13, which schematically illustrates an exploded view of an LED ceiling mount light in accordance with a ninth embodiment of the present disclosure. The present disclosure provides an LED ceiling mount light 1*n*, which includes a surrounding lamp shade 40, an LED illuminator 50, a controller assembly 60n, a base plate 90 for mounting the LED illuminator 50 and the controller assembly 60n. The surrounding lamp shade 40 is integrated with the LED illuminator 50 as a surrounding LED illuminator assembly.

The present disclosure is basically the same as that of first embodiment described in the above except that the controller assembly 60n is provided to replace the detector assembly 60. The controller assembly 60n includes at least a printed circuit board 62n jointly mounted in a housing 68n formed by a top cover 61n and a bottom cover 63n. The top cover 61n has a lens opening 610n formed in a center thereof. The bottom cover 63n of the housing 68n is mounted to the base plate 90. The controller assembly 60n may be also a detector assembly to provide the detection functions as described in the other embodiments. However, the controller assembly may include other circuitries such as an LED driver, dimmer, wireless receiver, wireless transmitter and illumination color tuner to manage various illumination performance of the LED lighting fixture.

Tenth Embodiment

Figure 14:
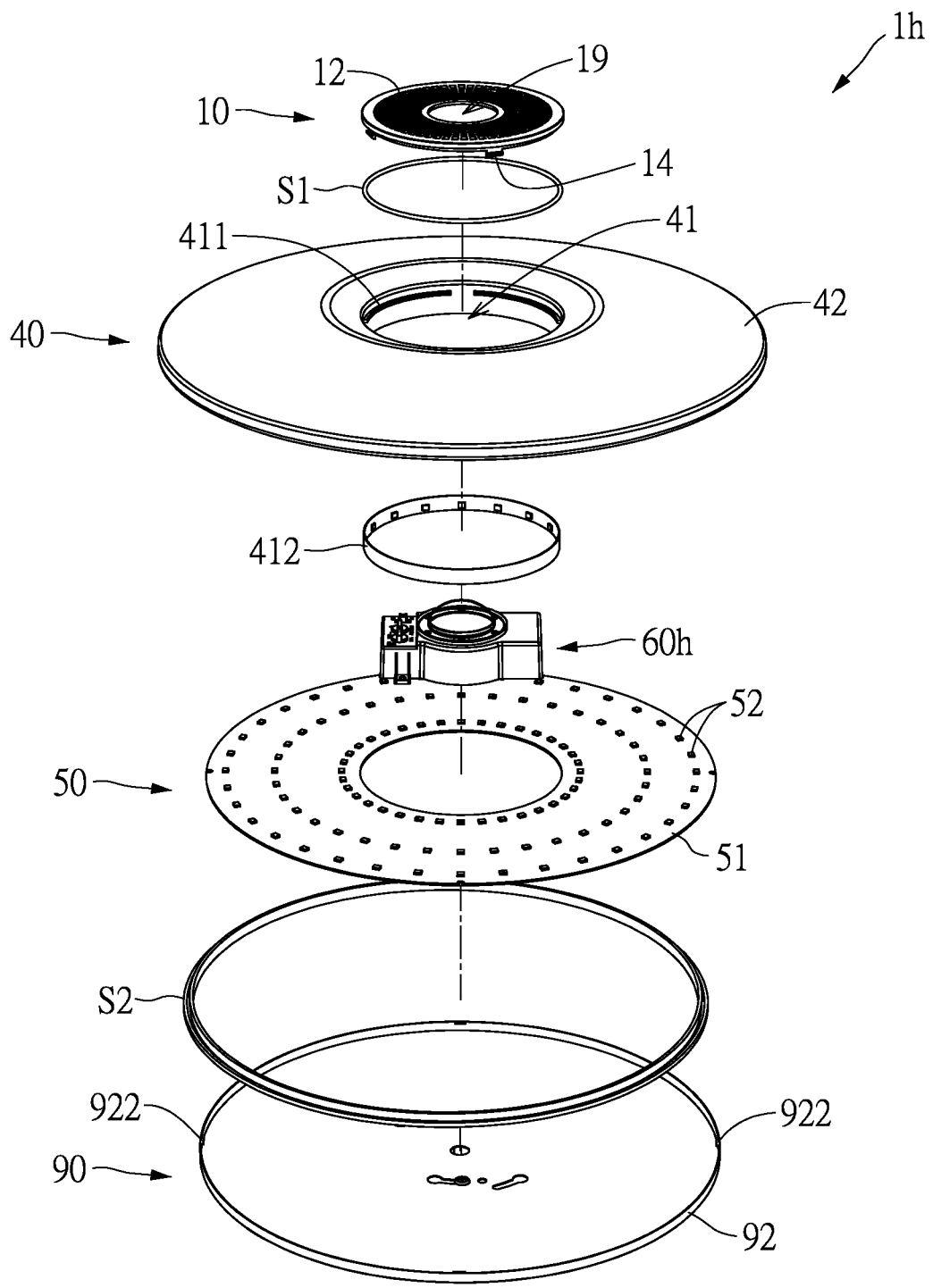
FIG. 14 is an exploded view of a LED security light of tenth embodiment of the present disclosure.

Please refer to the tenth embodiment of the present disclosure as shown in FIG. 14, which has an art design similar to FIG. 1 of the first embodiment except said embodiment further includes an edge-mounted LED module surrounding the detector assembly 60h for illuminating the cover plate 10. A plurality of light emitting diodes are edge-mounted on an inner surface of the cylindrical inner shell 41 to form an edge-mounted LED module 412.

Eleventh Embodiment

Figure 15:
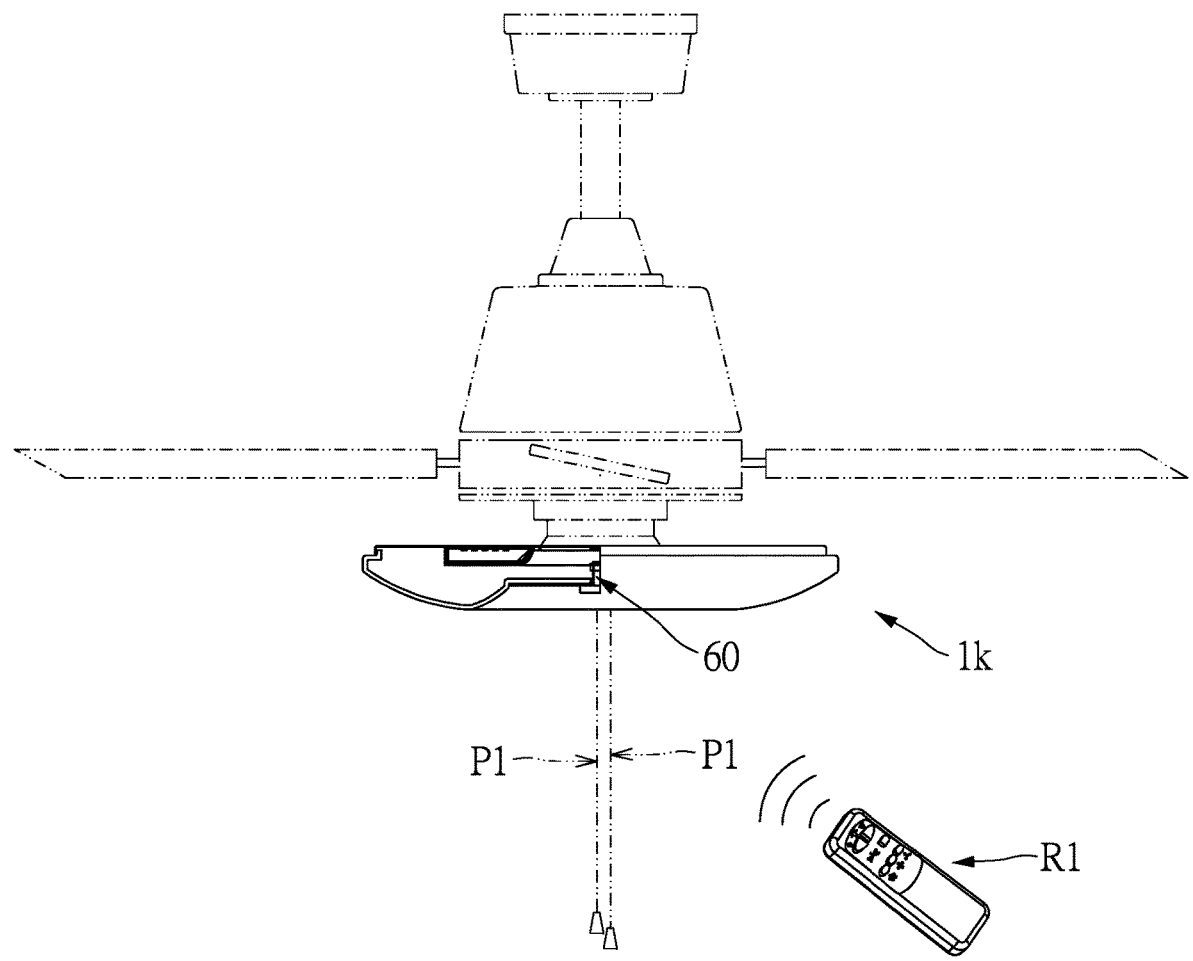
FIG. 15 is an exploded view of a LED security light of eleventh embodiment of the present disclosure.

Please refer to the eleventh embodiment of the present disclosure as shown in FIG. 15. An LED lighting fixture 1k is adaptable to a ceiling fan to form a ceiling fan assembly for controlling a fan speed and illumination characteristics of the ceiling fan assembly. The LED lighting fixture 1k is electrically coupled with the ceiling fan for receiving external control signals to respectively control a speed performance of the ceiling fan and a lighting performance of an LED illuminator. The external control signals are generated from an external control unit integrated with the detector assembly 60 and operated by a user. The external control unit may be implemented as a pull chain P1 in connection with a rotary switch in the detector assembly 60. The two pull chains P1 and P2 are to control the fan speed and the lighting performance respectively. The external control unit may include a wireless device which has a receiver integrated with the detector assembly 60 and a transmitter R1 played by a user.

Figure 16A:
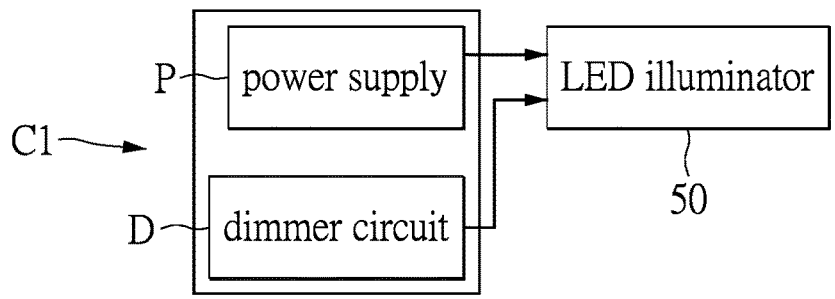
FIG. 16A to 16D are various functional block diagrams of a LED lighting fixture according to the present disclosure.
Figure 16B:
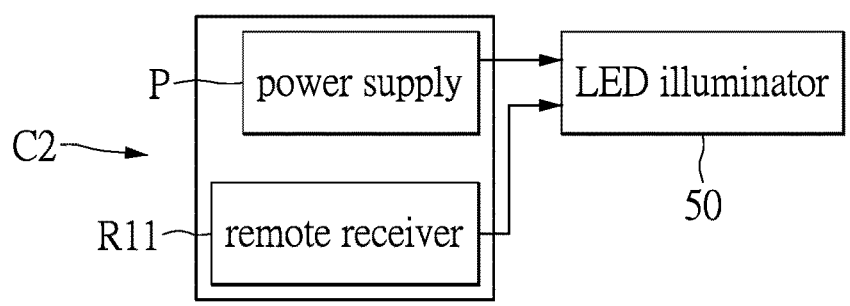
Figure 16C:
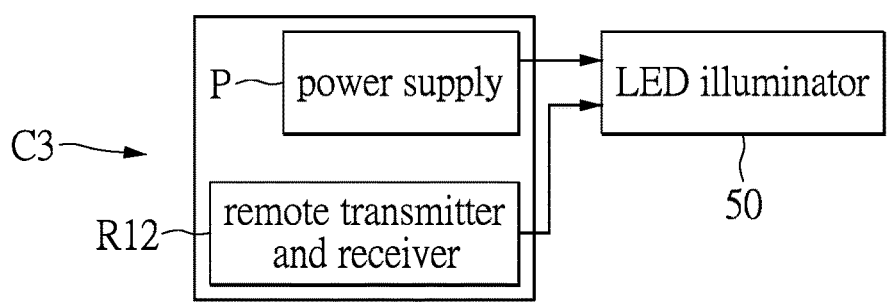
Figure 16D:
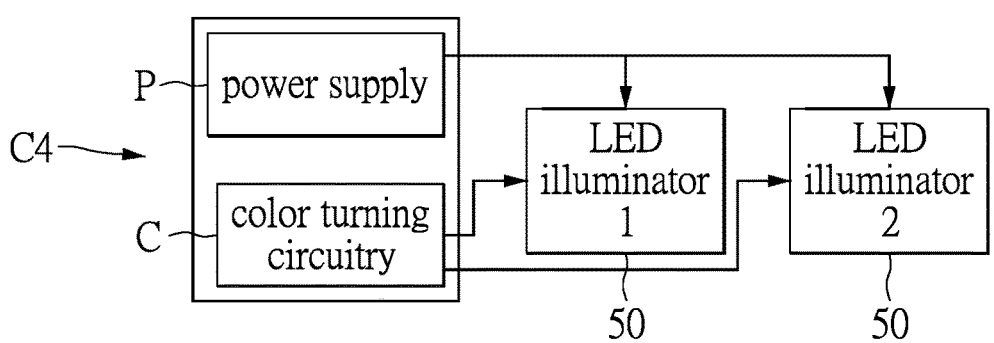

Please refer to the twelfth embodiment of the present disclosure as shown in FIG. 16A to FIG. 16D. Various functional block diagrams of an LED lighting fixture are introduced. As shown in FIG. 16A, a control assembly C1 includes a power supply P and a dimmer circuit D. The power supply P may be jointly operating with an LED driver to power an LED illuminator 50 and the dimmer circuit D further allows the LED illuminator 50 being adjusted to change illumination intensities via an external control signal. In FIGS. 16B and 16C, two control assemblies C2 and C3 respectively include a wireless transceiver (such as a remote receiver R11 in FIG. 16B or a remote transmitter and receiver R12 in FIG. 16C) which allows an LED illuminator 50 being controlled by a remote controller (like the transmitter R1 in FIG. 15) and/or to remotely control other LED illuminators located nearby. In FIG. 16D, an LED illuminator further includes at least a second LED illuminator emitting different color temperature, a control assembly C4 assembly includes a color tuning circuitry C, usually a power allocation circuit to allocate the powers being delivered to the at least two LED illuminators 50, allowing the LED illuminators 50 being adjusted to emit a mingled color temperature light from the LED lighting fixture.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An LED security light comprising:
    a base plate;
    a surrounding LED illuminator assembly, including:
        an LED illuminator, having a circuit board shaped in a doughnut or a ring, and a plurality of LEDs mounted on the circuit board,
        a surrounding lamp shade shaped with a central opening to form a surrounding configuration, being made of an optically transmissive material; wherein the LED illuminator is fully covered by the surrounding lamp shade and the surrounding lamp shade is further fastened to the base plate, and
        a cover plate, being recessed and mounted on an inner border of the surrounding lamp shade, the cover plate formed with a circular opening and designed with a punched out motif, so that the edge light emitted from the inner border of the surrounding LED illuminator assembly is diffused to illuminate the punched out motif; and
    a detector assembly, including at least one lens and a detection circuit, disposed in the center of the base plate of the LED security light in front of the LEDs of the LED illuminator and encompassed by the surrounding LED illuminator assembly, wherein the detector assembly is installed in an accommodating space formed between the cover plate and the base plate of the LED security light, wherein the lens is disposed through the circular opening of the cover plate;
    wherein the surrounding LED illuminator assembly is responsive to a first signal from the detector assembly to switch on the LED illuminator.

2. The LED security light according to claim 1, wherein the cover plate is illuminated by an edge light emitted from the inner border of the surrounding LED illuminator assembly.

3. The LED security light according to claim 1, wherein the surrounding lamp shade comprises a doughnut-shaped lamp shade.

4. The LED security light according to claim 3, wherein the doughnut-shaped lamp shade is a circular ring design.

5. The LED security light according to claim 3, wherein the doughnut-shaped lamp shade is further skirted with floral art.

6. The LED security light according to claim 3, wherein the doughnut-shaped lamp shade is a square ring design.

7. The LED security light according to claim 3, wherein the doughnut-shaped lamp shade is an octagonal ring design.

8. The LED security light according to claim 1, wherein the lens includes a dome-shaped lens.

9. The LED security light according to claim 1, wherein the detector assembly includes a passive infrared motion sensor.

10. The LED security light according to claim 1, wherein the detector assembly includes a motion sensor and a light sensor, wherein when an ambient light detected by the light sensor is lower than a first preset value, the light sensor outputs the first signal to a control circuit to manage the LED illuminator to emit a first level light, wherein when the ambient light detected by the light sensor is higher than a second preset value, the light sensor outputs a second signal to the control circuit to switch off the LED illuminator, wherein when a motion signal is detected by the motion sensor, the motion sensor outputs a third signal to the control circuit to manage the LED illuminator to emit a second level light for a predetermined time duration before resuming performing the first level light, wherein the light intensity of the second level light is higher than the light intensity of the first level light.

11. The LED security light according to claim 1, wherein the detector assembly includes a motion sensor and a light sensor, wherein when an ambient light detected by the light sensor is lower than a first preset value, the light sensor outputs the first signal to a control circuit to switch on the LED illuminator, wherein when the ambient light detected by the light sensor is higher than a second preset value, the light sensor outputs a second signal to the control circuit to switch off the LED illuminator, wherein when a motion signal is detected by the motion sensor, the motion sensor outputs a third signal to the control circuit to manage the LED illuminator to emit a first level light for a predetermined time duration before resuming a prior state.

12. The LED security light according to claim 1, wherein the detector assembly includes a light sensor, wherein when an ambient light detected by the light sensor is lower than a first preset value, the light sensor outputs the first signal to a control circuit to switch on the LED illuminator to emit a first level light, wherein when the ambient light detected by the light sensor is higher than a second preset value, the light sensor outputs a second signal to the control circuit to switch off the LED illuminator.

13. The LED security light according to claim 1, wherein the detector assembly includes a motion sensor that senses motion in a 360-degree angle coverage of viewing field via the lens.

14. The LED security light according to claim 1, wherein the detector assembly includes a light sensor that senses an ambient light external to the LED security light.

15. The LED security light according to claim 14, wherein the light sensor senses the ambient light via the lens.

16. The LED security light according to claim 1, wherein the detector assembly includes a video detector and a light sensor for surveilling motion activities in a detection zone day and night, wherein the lens is a camera lens, wherein the video detector further includes a two way wireless communication circuit to receive a wireless external control signal to activate the video detector and to transmit a digital video signal, wherein at dusk level the LED security light is automatically turned on by the light sensor to provide an adequate illumination for performing a video detection.

17. The LED security light according to claim 1, wherein the detector assembly includes a video detector, a motion sensor and a photo cell for surveilling motion activities in a detection zone day and night, wherein the cover plate is further configured with a circular opening for installing a camera lens of the video detector, wherein during a day time when a motion intrusion is detected by the motion sensor, the video detector is activated to continuously photograph a motion intrusion event scene, processing the motion intrusion event scene into a digital video signal, recording the video digital signal and transmitting the video digital signal to a mobile device to perform at least one security alert, wherein at dusk the LED security light is automatically turned on to provide an adequate illumination to perform a video detection.

18. The LED security light according to claim 1, further comprising:
a controller assembly, wherein the controller assembly includes at least a driving circuitry for regulating an electric power delivered to the LED illuminator, disposed in the center of the base plate of the LED security light and encompassed by the surrounding LED illuminator assembly; wherein the controller assembly is installed in the accommodating space formed between the cover plate and the base plate of the LED security light.

19. The LED security light according to claim 18, wherein the surrounding LED illuminator assembly comprises at least one doughnut-shaped lamp shade.

20. The LED security light according to claim 19, wherein the doughnut-shaped lamp shade is a circular ring design.

21. The LED light fixture according to claim 19, wherein the doughnut-shaped shade is further skirted with floral art on an outer border thereof.

22. The LED security light according to claim 19, wherein the doughnut-shaped lamp shade is a square ring design.

23. The LED security light according to claim 19, wherein the doughnut-shaped lamp shade is an octagonal ring design.

24. The LED security light according to claim 1, wherein the LED illuminator is disposed inside a housing space defined between the surrounding lamp shade and the base plate, wherein the surrounding lamp shade transmits and diffuses the light emitted by the LED illuminator along the surface of the surrounding lamp shade.

25. The LED security light according to claim 1, wherein the cover plate is detachably fastened with the surrounding lamp shade.

26. The LED security light according to claim 1, wherein the LEDs of the LED illuminator are surface-mounted.

27. The LED security light according to claim 1, wherein the surrounding LED illuminator assembly includes a plurality of LED illuminators configured to jointly encompass the detector assembly, wherein the LEDs of the LED illuminator are evenly allocated to each of the LED illuminators, wherein the base plate is composed of a plurality of bottom plates with each connecting to a corresponding arm structure, wherein each of the LED illuminators includes a lamp shade, the bottom plate and the corresponding arm structure configured to mechanically connect to the bottom plate and to electrically connect to a power source controlled by the detector assembly, wherein the surrounding lamp shade is composed of a plurality of the lamp shades respectively fastened to the bottom plate to create a corresponding housing space for accommodating and installing the allocated LEDs to form each of the LED illuminators.

28. The LED security light according to claim 27, wherein the allocated LEDs are surface-mounted on the base plate with a printed circuit board.

29. The LED security light according to claim 1, wherein the surrounding LED illuminator assembly includes a plurality of LED illuminators configured to jointly encompass the detector assembly, wherein the LEDs of the LED illuminator are evenly allocated to each LED illuminator, wherein each LED illuminator is configured with a lamp shade and an arm structure, wherein the LEDs allocated to each LED illuminator are disposed within a channel configured inside the arm structure, wherein the surrounding lamp shade is composed of a plurality of the lamp shades respectively inserted into the corresponding arm structure and fastened with the arm structure, wherein an edge surface of the end of the each lamp shade transmits light emitted by the LEDs and diffuses the light along the front surface of the lamp shade for each LED illuminator.

30. The LED security light according to claim 18, wherein the controller assembly adjusts a light intensity of the LED illuminator by a user.

31. The LED security light according to claim 18, wherein the LED security light is adaptable to a ceiling fan to form a ceiling fan assembly for controlling a fan speed and illumination characteristics of the ceiling fan assembly, wherein the LED security light is electrically coupled with the ceiling fan to receive external signals to respectively control a speed performance of the ceiling fan and a lighting performance of the LED illuminator, wherein the external control signals are generated from an external control unit operated by a user.

32. The LED security light according to claim 31, wherein the external control unit includes at least two rotary switches to respectively control the speed performance of the ceiling fan and the lighting performance of the LED illuminator, wherein each of the two rotary switches is configured to be connected to a pull chain to be used to respectively operate each of the two rotary switches.

33. The LED security light according to claim 31, wherein the external control unit includes a remote control device.

34. The LED security light according to claim 18, wherein the controller assembly further includes a remote control device integrated with the driving circuitry for receiving a wireless external control signal to adjust an illumination performance of the LED illuminator including at least an on/off control mode, a dimming control mode or a color temperature tuning mode.

35. The LED security light according to claim 34, wherein the remote control device is a transceiver enabling a two way communication between the LED security light and a remote device for controlling an illumination performance on a remote basis.

36. The LED security light according to claim 18, wherein the LEDs of the LED illuminator are divided into two sets of LEDs having different color temperatures, wherein a first set of the LEDs emits light with a high color temperature and a second set of the LEDs emits light with a low color temperature, wherein a color temperature tuning for the LED illuminator is achieved by managing a combination of different light intensities between the first set of the LEDs and the second set of the LEDs, wherein paired combinations of different light intensities between the first set of the LEDs and the second set of the LEDs are preprogrammed for selection by a user.

37. An LED security light comprising:
a base plate;
a surrounding LED illuminator assembly, including:
  an LED illuminator, having a circuit board shaped in a doughnut or a ring, and a plurality of LEDs mounted on the circuit board, and
  a surrounding lamp shade shaped with a central opening to form a surrounding configuration, being made of an optically transmissive material; wherein the LED illuminator is fully covered by the surrounding lamp shade and the surrounding lamp shade is further fastened to the base plate,
a controller assembly, installed in the accommodating space formed between cover plate and the base plate of the LED security light;
wherein the surrounding LED illuminator assembly is responsive to a signal from the controller assembly to switch on the LED illuminator;
wherein the inner side of the cover plate is further covered with a diffuser sheet such that the edge light emitted from the inner border of the surrounding LED illuminator assembly is evenly diffused across the surface of the diffuser sheet of the cover plate and shadow of the controller assembly is not externally visible.

38. An LED security light comprising:
a base plate;
a surrounding LED illuminator assembly, including:
  an LED illuminator, having a circuit board shaped in a doughnut or a ring, and a plurality of LEDs mounted on the circuit board, and
  a surrounding lamp shade shaped with a central opening to form a surrounding configuration, being made of an optically transmissive material; wherein the LED illuminator is fully covered by the surrounding lamp shade and the surrounding lamp shade is further fastened to the base plate, and
a detector assembly, including a detection circuit, disposed in the center of the base plate of the LED security light and encompassed by the surrounding LED illuminator assembly, wherein the detector assembly is installed in an accommodating space formed between a cover plate and the base plate of the LED security light, wherein the cover plate is recessed and mounted on an inner border of the surrounding lamp shade;
wherein the surrounding LED illuminator assembly is responsive to a first signal from the detector assembly to switch on the LED illuminator;
wherein a cylinder base is further attached to the inner border of the surrounding lamp shade, wherein portion of the LEDs are edge-mounted against the surrounding lamp shade on a surface of the cylinder base to radically emit light.

39. The LED security light according to claim 38, wherein the LEDs are edge-mounted on the surface of the cylinder base to illuminate the cover plate.

* * * * *